United States Patent
Gillian et al.

(10) Patent No.: US 11,573,311 B2
(45) Date of Patent: Feb. 7, 2023

(54) SMART-DEVICE-BASED RADAR SYSTEM PERFORMING ANGULAR ESTIMATION USING MACHINE LEARNING

(71) Applicant: Google LLC, Mountain View, CA (US)

(72) Inventors: Nicholas Edward Gillian, Palo Alto, CA (US); Michal Matuszak, Sunnyvale, CA (US); Octavio Ponce Madrigal, Munich (DE); Jaime Lien, Mountain View, CA (US); Patrick M. Amihood, Palo Alto, CA (US); Ivan Poupyrev, Los Altos, CA (US)

(73) Assignee: Google LLC, Mountain View, CA (US)

( * ) Notice: Subject to any disclaimer, the term of this patent is extended or adjusted under 35 U.S.C. 154(b) by 204 days.

(21) Appl. No.: 16/772,760

(22) PCT Filed: Apr. 2, 2019

(86) PCT No.: PCT/US2019/025436
§ 371 (c)(1),
(2) Date: Jun. 12, 2020

(87) PCT Pub. No.: WO2019/195327
PCT Pub. Date: Oct. 10, 2019

(65) Prior Publication Data
US 2020/0355817 A1 Nov. 12, 2020

Related U.S. Application Data

(60) Provisional application No. 62/653,307, filed on Apr. 5, 2018.

(51) Int. Cl.
G01S 13/44 (2006.01)
G01S 13/34 (2006.01)
(Continued)

(52) U.S. Cl.
CPC .......... *G01S 13/4418* (2013.01); *G01S 13/34* (2013.01); *G01S 13/726* (2013.01); *G06N 3/0445* (2013.01)

(58) Field of Classification Search
CPC .... G01S 13/4418; G01S 13/34; G01S 13/726; G06N 3/0445
See application file for complete search history.

(56) References Cited

U.S. PATENT DOCUMENTS 5,768,477 A * 6/1998 Johnson .................... G01S 3/74
706/24
5,831,570 A * 11/1998 Ammar ................. F41G 7/2246
342/149

(Continued)

FOREIGN PATENT DOCUMENTS

WO 2011104673 9/2011
WO WO-2011104673 A1 * 9/2011 ............. G06F 3/017

(Continued)

OTHER PUBLICATIONS

"Corrected Notice of Allowance", U.S. Appl. No. 15/844,460, filed Feb. 4, 2021, 2 pages.

(Continued)

*Primary Examiner* — Peter M Bythrow
*Assistant Examiner* — Nazra Nur Waheed
(74) *Attorney, Agent, or Firm* — Colby Nipper PLLC

(57) ABSTRACT

Techniques and apparatuses are described that implement a smart-device-based radar system capable of performing angular estimation using machine learning. In particular, a radar system 102 includes an angle-estimation module 504 that employs machine learning to estimate an angular position of one or more objects (e.g., users). By analyzing an irregular shape of the radar system 102's spatial response across a wide field of view, the angle-estimation module 504 can resolve angular ambiguities that may be present based (Continued)

on the angle to the object or based on a design of the radar system 102 to correctly identify the angular position of the object. Using machine-learning techniques, the radar system 102 can achieve a high probability of detection and a low false-alarm rate for a variety of different antenna element spacings and frequencies.

20 Claims, 15 Drawing Sheets

(51) Int. Cl.
*G01S 13/72* (2006.01)
*G06N 3/04* (2006.01)

(56) References Cited

U.S. PATENT DOCUMENTS

| | | | |
|---|---|---|---|
| 9,562,968 B2* | 2/2017 | Wu | G01S 3/74 |
| 9,739,877 B2 | 8/2017 | Fehrenbach et al. | |
| 9,817,109 B2* | 11/2017 | Saboo | G06F 3/011 |
| 10,935,651 B2 | 3/2021 | Lien et al. | |
| 2007/0025723 A1 | 2/2007 | Baudisch et al. | |
| 2007/0285315 A1 | 12/2007 | Davis et al. | |
| 2009/0239551 A1 | 9/2009 | Woodsum | |
| 2011/0090981 A1 | 4/2011 | Lindgren et al. | |
| 2013/0116561 A1 | 5/2013 | Rothberg et al. | |
| 2014/0159945 A1 | 6/2014 | Chung et al. | |
| 2016/0018509 A1 | 1/2016 | McCorkle | |
| 2016/0146932 A1 | 5/2016 | Millar et al. | |
| 2016/0252620 A1 | 9/2016 | Ebling | |
| 2016/0350620 A1* | 12/2016 | Rao | A61B 8/13 |
| 2017/0097413 A1 | 4/2017 | Gillian et al. | |
| 2017/0117946 A1* | 4/2017 | Lee | G01S 13/931 |
| 2017/0212205 A1 | 7/2017 | Bialer et al. | |
| 2018/0011180 A1 | 1/2018 | Warnick et al. | |
| 2018/0131089 A1 | 5/2018 | Yilmaz et al. | |
| 2018/0183650 A1* | 6/2018 | Zhang | H04B 1/38 |
| 2019/0187268 A1 | 6/2019 | Lien et al. | |
| 2019/0394838 A1 | 12/2019 | Metodiev et al. | |
| 2020/0058310 A1 | 2/2020 | Goodwin et al. | |
| 2020/0104613 A1* | 4/2020 | Hirai | G06V 10/48 |
| 2021/0156985 A1 | 5/2021 | Lien et al. | |
| 2022/0155440 A1 | 5/2022 | Kruse | |
| 2022/0283322 A1 | 9/2022 | Faragher et al. | |

FOREIGN PATENT DOCUMENTS

| | | |
|---|---|---|
| WO | 2019118013 | 6/2019 |
| WO | 2019195327 | 10/2019 |

OTHER PUBLICATIONS

"First Action Interview Office Action", U.S. Appl. No. 15/844,460, filed Jul. 1, 2020, 3 Pages.

"International Preliminary Report on Patentability", Application No. PCT/US2018/047446, Jun. 25, 2020, 14 pages.

"Corrected Notice of Allowability", U.S. Appl. No. 15/844,460, filed Nov. 23, 2020, 2 pages.

"International Preliminary Report on Patentability", Application No. PCT/US2019/025436, Oct. 15, 2020, 12 pages.

"Notice of Allowance", U.S. Appl. No. 15/844,460, filed Oct. 23, 2020, 9 pages.

Fonseca, et al., "On the Design of a Compact Neural Network-Based DOA Estimation System", IEEE Transactions an Antennas and Propagation, IEEE Service Center, Piscataway, NJ, US, vol. 58, No. 2, Feb. 2010, pp. 357-366.

"EP Appeal Decision", European Application No. 10194359.5, May 28, 2019, 20 pages.

"Galaxy S4 Air Gesture", Galaxy S4 Guides, retrieved from: https://allaboutgalaxys4.com/galaxy-s4-features-explained/air-gesture/ on Sep. 3, 2019, 4 pages.

"International Search Report and Written Opinion", PCT Application No. PCT/US2018/047446, Dec. 21, 2018, 21 pages.

"International Search Report and Written Opinion", PCT Application No. PCT/US2019/025436, Jul. 11, 2019, 19 pages.

"Invitation to Pay Additional Fees", PCT Application No. PCT/US2018/047446, Oct. 23, 2018, 12 pages.

"Pre-Interview Communication", U.S. Appl. No. 15/844,460, filed May 14, 2020, 3 Pages.

"Restriction Requirement", U.S. Appl. No. 15/844,460, filed Mar. 24, 2020, 6 Pages.

"Samsung Galaxy S4 Air Gestures", Video retrieved from https://www.youtube.com/watch?v=375Hb87yGcg, May 7, 2013, 4 pages.

"Foreign Office Action", EP Application No. 18765260.7, Mar. 16, 2022, 8 pages.

"Non-Final Office Action", U.S. Appl. No. 17/164,637, filed Nov. 22, 2022, 12 pages.

\* cited by examiner

SMART-DEVICE-BASED RADAR SYSTEM PERFORMING ANGULAR ESTIMATION USING MACHINE LEARNING

CROSS-REFERENCE TO RELATED APPLICATION

This application claims the benefit of U.S. Provisional Application No. 62/653,307 filed 5 Apr. 2018, the disclosure of which is hereby incorporated by reference in its entirety herein.

BACKGROUND

Radars are useful devices that can detect and track objects. While radar is a common tool used in military and air-traffic-control operations, technological advances are making it possible to integrate radars in consumer devices. In many cases, a radar may replace bulky and expensive sensors, such as a camera, and provide improved performance in the presence of different environmental conditions, such as low lighting and fog, or with moving or overlapping objects. While it may be advantageous to use the radar, there are many challenges associated with integrating the radar in consumer devices.

One such problem involves restrictions that a smaller consumer device may place on a radar antenna's design. To satisfy size or layout constraints, for example, fewer antenna elements and larger or smaller antenna element spacings may be used. This may cause angular ambiguities, which make it challenging for the radar to estimate an angular position of an object. If the radar is unable to determine the object's location, effective operation and capability of the radar is significantly reduced. This can lead to user frustration or limit the types of applications or environments that the radar can support.

SUMMARY

Techniques and apparatuses are described that implement a smart-device-based radar system capable of performing angular estimation using machine learning. In particular, a radar system includes an angle-estimation module that employs machine learning to estimate an angular position of one or more objects (e.g., users). The angle-estimation module generates angular probability data based on a unique angular signature of the object. The angular probability data comprises a probability distribution of the angular position of the one or more objects across two or more angular bins. By analyzing an irregular shape of the radar system's spatial response across a wide field of view, the angle-estimation module can resolve angular ambiguities that may be present based on the angle to the object or based on a design of the radar system to correctly identify the angular position of the object.

The angular estimation module is implemented by a machine-learned module, which can include a neural network, a convolutional neural network, a long short-term memory network, or a combination thereof. In some cases, the machine-learned module also implements a digital beamformer, a tracker module, or a quantization module to improve angular estimation performance of the radar system. The machine-learned module can be tailored to various smart devices, which may have different amounts of available power, computational capability, memory, radar antenna configurations, radar-based applications, and so forth. With machine-learning techniques, the radar system can achieve a high probability of detection and a low false-alarm rate for a variety of different antenna element spacings and frequencies.

Aspects described below include a smart device with a radar system. The radar system includes an antenna array, a transceiver, a digital beamformer, and an angle-estimation module. The transceiver is coupled to the antenna array and is configured to transmit and receive a radar signal via the antenna array. The radar signal is reflected by at least one object. The digital beamformer is coupled to the transceiver and is configured to generate beamforming data based on the received radar signal. The angle-estimation module is coupled to the digital beamformer and is configured to generate, using machine learning, angular probability data based on the beamforming data. The angular probability data comprises a probability distribution of an angular position of the at least one object.

Aspects described below also include a method for performing operations of a smart-device-based radar system capable of performing angular estimation using machine learning. The method includes transmitting and receiving a radar signal via an antenna array. The radar signal is reflected by at least one object. The method also includes generating beamforming data based on the received radar signal. Using machine learning, the method includes analyzing the beamforming data to determine a probability distribution of an angular position of the at least one object across two or more angular bins. The method further includes determining that an angular bin of the two or more angular bins is associated with the angular position of the at least one object based on the probability distribution.

Aspects described below include a computer-readable storage media comprising computer-executable instructions that, responsive to execution by a processor, implement an angle-estimation module and a tracker module. The angle-estimation module is configured to accept beamforming data associated with a received radar signal that is reflected by at least one object. The angle-estimation module is also configured to generate, using machine learning, angular probability data based on the beamforming data. The angular probability data comprises a probability distribution of an angular position of the at least one object. The tracker module is configured to determine the angular position of the at least one object based on the probability distribution.

Aspects described below also include a system with machine-learning means for performing angular estimation based on a received radar signal.

BRIEF DESCRIPTION OF THE DRAWINGS

Apparatuses for and techniques implementing a smart-device-based radar system capable of performing angular estimation using machine learning are described with reference to the following drawings. The same numbers are used throughout the drawings to reference like features and components:

FIG. 6-1 illustrates an example scheme implemented by a digital beamformer for performing angular estimation using machine learning.

FIG. 6-2 illustrates another example scheme implemented by a digital beamformer for performing angular estimation using machine learning.

DETAILED DESCRIPTION

Overview

Figure 1:
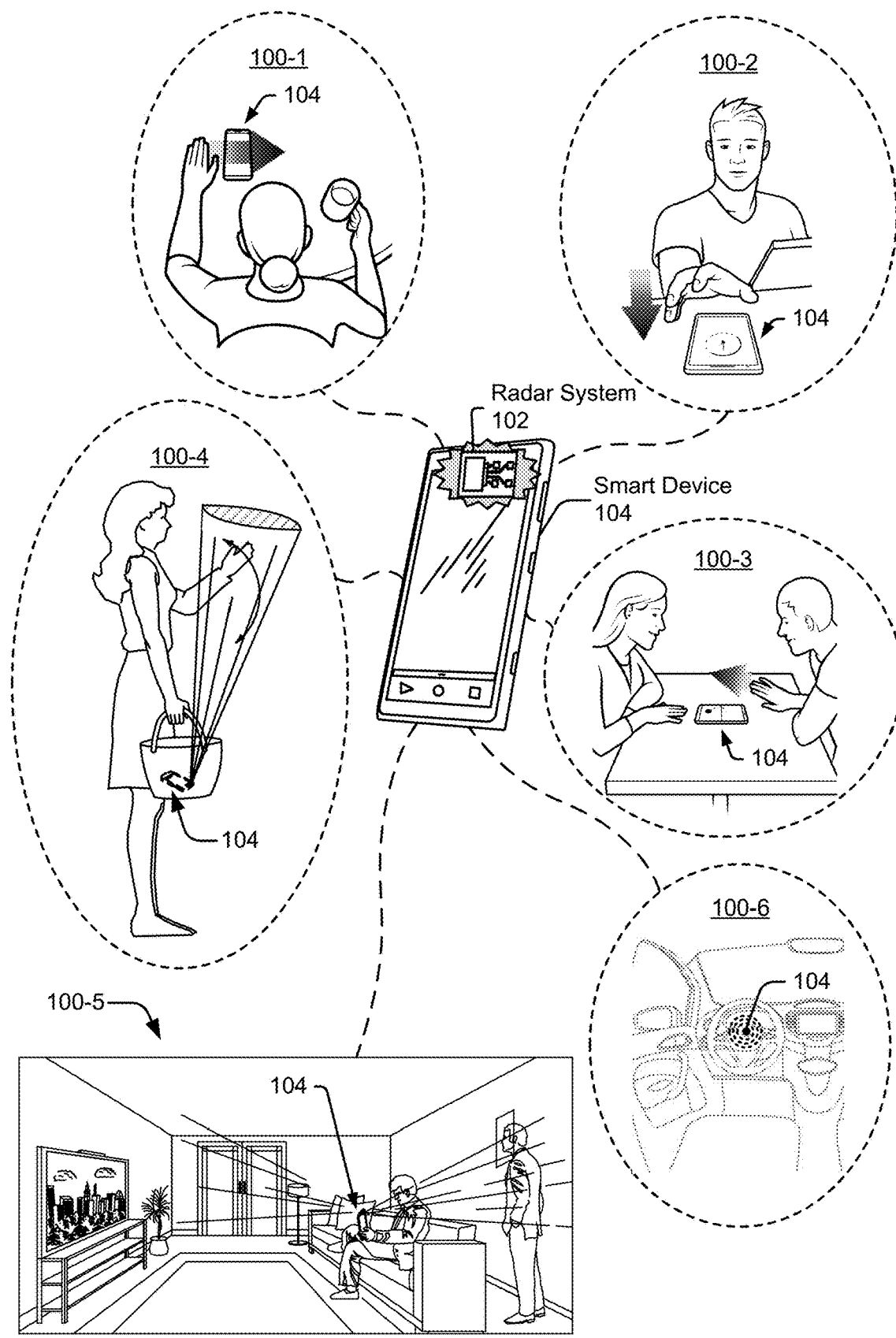
FIG. 1 illustrates example environments in which a smart-device-based radar system capable of performing angular estimation using machine learning can be implemented.

This document describes techniques and devices that implement a smart-device-based radar system capable of performing angular estimation using machine learning. Conventional angular estimation techniques identify an angular position of an object based on a direction corresponding to a highest detected peak amplitude. This is possible because conventional radar systems use antenna arrays and wavelengths that minimize angular ambiguities (e.g., antenna element spacings that are approximately half of the wavelength). Antenna element spacings that are smaller or larger than half of the wavelength, however, can significantly increase angular ambiguity. Consequently, it becomes challenging to determine the angular position of the object.

To further avoid angular ambiguities, other conventional techniques constrain a field of view, which represents a range of angles that are considered possible for the object's angular position. By limiting the field of view, conventional techniques can avoid an ambiguous zone, which has angular ambiguities, and thereby reduce false detections. Limiting the field of view, however, reduces a range of angles that a radar system can monitor to detect the object. As an example, angular ambiguities can be avoided for a wavelength of 5 millimeters (mm) and an element spacing of 3.5 mm (e.g., the element spacing being 70% of the wavelength) if the field of view is limited to angles between approximately −45 degrees to 45 degrees. Consequently, the radar system may be unable to detect objects that are beyond the 45-degree limits, which can significantly limit the capability of the radar system.

Incorporating radar sensors within smart devices can constrain a design of the radar sensor. As a result, angular ambiguities may be present based on the antenna element spacing and field of view. Furthermore, for wide-band radars that are capable of transmitting and receiving radar signals using a wide range of wavelengths, the element spacing may not be optimal for each of the different wavelengths, thereby causing some radar signals to be more susceptible to angular ambiguities than others.

Instead of using conventional signal-processing techniques, the described techniques implement a smart-device-based radar system capable of performing angular estimation using machine learning. In particular, a radar system includes an angle-estimation module that employs machine learning to estimate an angular position of one or more objects (e.g., users). The angle-estimation module generates angular probability data based on a unique angular signature of the object. The angular probability data comprises a probability distribution of the angular position of the one or more objects across two or more angular bins. To generate the angular probability data, the angle-estimation module analyzes an irregular shape of the radar system's beamforming data across a wide field of view, and resolves angular ambiguities that may be present based on the angle to the object or based on a design of the radar system to assign a high probability to an angular bin that corresponds to the angular position of the object.

The angular estimation module is implemented by a machine-learned module, which can include a neural network, a convolutional neural network, a long short-term memory network, or a combination thereof. In some cases, the machine-learned module also implements a digital beamformer, a tracker module, or a quantization module to improve angular estimation performance of the radar system. The machine-learned module can be tailored to various smart devices, which may have different amounts of available power, computational capability, memory, radar antenna configurations, radar-based applications, and so forth. With machine-learning techniques, the radar system can achieve a high probability of detection and a low false-alarm rate for a variety of different antenna element spacings and frequencies.

Example Environment

FIG. 1 is an illustration of example environments 100-1 to 100-6 in which techniques using, and an apparatus including, a smart-device-based radar system capable of performing angular estimation using machine learning may be embodied. In the depicted environments 100-1 to 100-6, a smart device 104 includes a radar system 102 capable of estimating angles to one or more objects (e.g., users) using machine learning. The smart device 104 is shown to be a smart phone in environments 100-1 to 100-5 and a steering wheel in the environment 100-6.

In the environments 100-1 to 100-4, a user performs different types of gestures, which are detected by the radar system 102. For example, the user in environment 100-1 makes a scrolling gesture by moving a hand above the smart device 104 along a horizontal dimension (e.g., from a left side of the smart device 104 to a right side of the smart device 104). In the environment 100-2, the user makes a reaching gesture, which decreases a distance between the smart device 104 and the user's hand. The users in environment 100-3 make hand gestures to play a game on the smart device 104. In one instance, a user makes a pushing gesture by moving a hand above the smart device 104 along a vertical dimension (e.g., from a bottom side of the smart device 104 to a top side of the smart device 104). In the environment 100-4, the smart device 104 is stored within a purse and the radar system 102 provides occluded-gesture recognition by detecting gestures that are occluded by the purse.

The radar system 102 can also recognize other types of gestures or motions not shown in FIG. 1. Example types of gestures include, a knob-turning gesture in which a user curls their fingers to grip an imaginary door knob and rotate their fingers and hand in a clockwise or counter-clockwise fashion to mimic an action of turning the imaginary door knob. Another example type of gesture includes a spindle-twisting gesture, which a user performs by rubbing a thumb and at least one other finger together. The gestures can be two-dimensional, such as those usable with touch-sensitive displays (e.g., a two-finger pinch, a two-finger spread, or a tap). The gestures can also be three-dimensional, such as many sign-language gestures, e.g., those of American Sign Language (ASL) and other sign languages worldwide. Upon detecting each of these gestures, the smart device 104 can perform an action, such as display new content, move a cursor, activate one or more sensors, open an application, and so forth. In this way, the radar system 102 provides touch-free control of the smart device 104.

In the environment 100-5, the radar system 102 generates a three-dimensional map of a surrounding environment for contextual awareness. The radar system 102 also detects and tracks multiple users to enable both users to interact with the smart device 104. The radar system 102 can also perform vital-sign detection. In the environment 100-6, the radar system 102 monitors vital signs of a user that drives a vehicle. Example vital signs include a heart rate and a respiration rate. If the radar system 102 determines that the driver is falling asleep, for instance, the radar system 102 can cause the smart device 104 to alert the user. Alternatively, if the radar system 102 detects a life-threatening emergency, such as a heart attack, the radar system 102 can cause the smart device 104 to alert a medical professional or emergency services.

Some implementations of the radar system 102 are particularly advantageous as applied in the context of smart devices 104, for which there is a convergence of issues. This can include a need for limitations in a spacing and layout of the radar system 102 and low power. Exemplary overall lateral dimensions of the smart device 104 can be, for example, approximately eight centimeters by approximately fifteen centimeters. Exemplary footprints of the radar system 102 can be even more limited, such as approximately four millimeters by six millimeters with antennas included. Exemplary power consumption of the radar system 102 may be on the order of a few milliwatts to tens of milliwatts (e.g., between approximately two milliwatts and twenty milliwatts). The requirement of such a limited footprint and power consumption for the radar system 102 enables the smart device 104 to include other desirable features in a space-limited package (e.g., a camera sensor, a fingerprint sensor, a display, and so forth).

To integrate the radar system 102 within the smart device 104, an arrangement of antenna elements within the radar system 102 can be based on a physical size or layout of the smart device 104. In some cases, the arrangement of the antenna elements may cause angular ambiguities to be present, which are further described with respect to FIG. 2.

Figure 2:
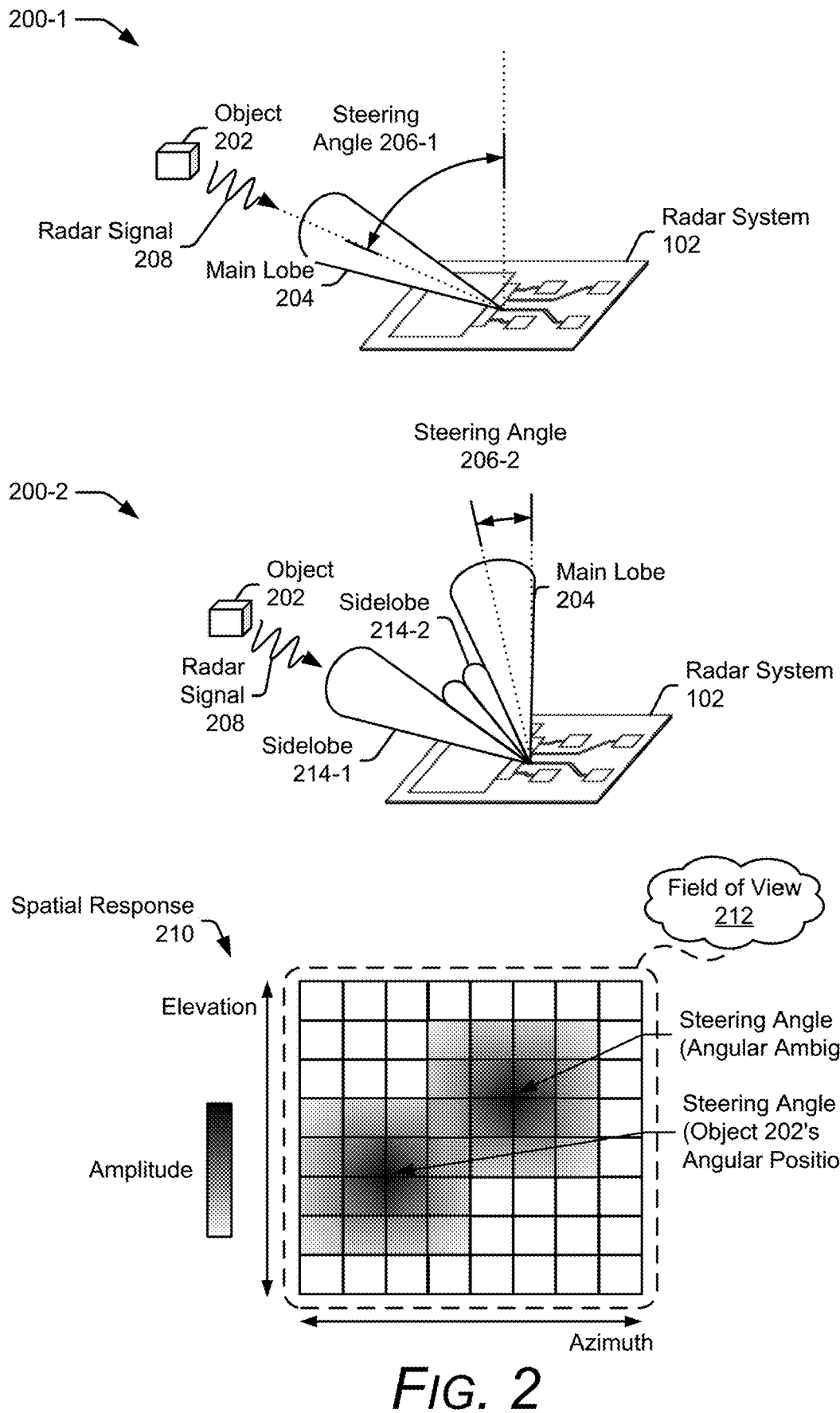
FIG. 2 illustrates an example angular ambiguity that can be resolved using machine learning.

FIG. 2 illustrates an example angular ambiguity that can be resolved using machine learning. In the depicted environment 200-1, the radar system 102 searches for an object 202 by steering a main lobe 204 of an antenna pattern via digital beamforming techniques. Digital beamforming enables responses from each receiving antenna element to be digitally combined to form multiple simultaneous beams. Generally speaking, the multiple simultaneous beams represent different steering angles 206 of the main lobe 204. A steering angle 206-1, for example, can include a two-dimensional angular direction of the main lobe 204 having an azimuth component and an elevation component.

Although not shown in the environment of 200-1, the antenna pattern includes additional undesired lobes (e.g., a sidelobe or a grating lobe) that can be directed towards the object 202 for different steering angles 206. In general, the sidelobe has an amplitude response that is lower than the main lobe 204, and the grating lobe, which is a type of sidelobe, has an amplitude response relatively similar to the main lobe 204. Example sidelobes 214-1 and 214-2 are shown in environment 200-2. While conventional techniques may design the radar system 102's antenna array to increase an amplitude difference between the main lobe 204 and the sidelobes 214 or decrease a quantity of grating lobes within the field of view, these techniques may not be possible based on imposed design constraints for integrating the radar system 102 within the smart device 104. Consequently, if the main lobe 204 is steered in another direction away from the object 202, as shown in the environment 200-2 via steering angle 206-2, the sidelobe 214-1 becomes unintentionally directed towards the object 202.

The multiple beams that are formed via digital beamforming produce a spatial response 210, which includes amplitude and phase information for different steering angles 206. In FIG. 2, the amplitude information is shown in the spatial response 210 via different shadings. A darker shade indicates a higher amplitude and a lighter shade indicates a lower amplitude. The spatial response 210 includes multiple peak amplitudes within the field of view 212; one at the steering angle 206-1 and another at the steering angle 206-2. Assuming the amplitudes at these two steering angles 206 are relatively similar (e.g., within approximately ten decibels), conventional techniques cannot distinguish between whether the object 202 is positioned at the steering angle 206-1 or the steering angle 206-2 (e.g., an amplitude difference between the two steering angles 206-1 and 206-2 is insufficient for determining the object 202's angular position). This can further lead conventional radar systems to incorrectly determine that there are additional objects in the environment (e.g., cause false detections) or incorrectly identify the position of the object 202 as corresponding to the steering angle 206-2.

Because multiple steering angles 206 can have large amplitudes for a single object 202, determining which amplitude corresponds to the object 202 is the challenge that radar angular estimation using machine learning addresses. Instead of solely considering a highest amplitude, the machine learning analyzes a shape of the spatial response 210 across the field of view 212. In this case, the field of view 212 includes the ambiguous zone to enable differences in amplitudes or phases to be considered across additional angles. Assuming a center wavelength of 5 millimeters (mm) and an element spacing of 3.5 mm, the field of view 212 can include angles beyond −45 degrees and 45 degrees (e.g., the field of view used by conventional techniques). The field of view 212, for example, can include angles between approximately −90 degrees to 90 degrees, or up to approximately −180 degrees and 180 degrees. These angular ranges can also be applied across one or more angular dimensions (e.g., azimuth and/or elevation). Analyzing the shape of the spatial response 210 to estimate the angular position of the object 202 is further explained with respect to FIG. 3.

Figure 3:
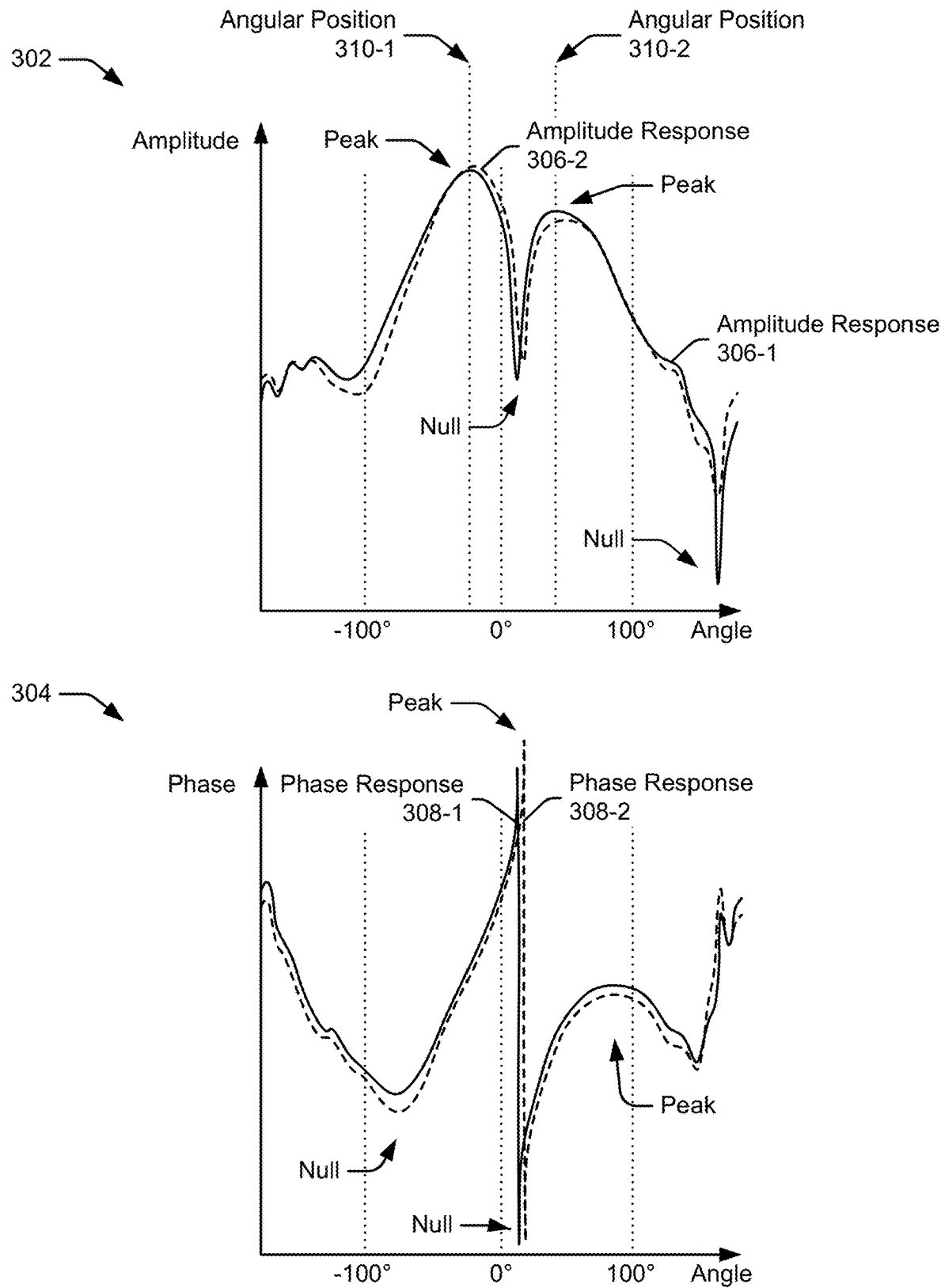
FIG. 3 illustrates example amplitude and phase plots of a spatial response for two angular positions of an object.

FIG. 3 illustrates example amplitude and phase plots of the spatial response 210 for two angular positions of the object 202. The amplitude plot 302 (e.g., amplitude response) and the phase plot 304 (e.g., phase response) respectively depict amplitude and phase differences that can occur for different angular positions of the object and for different steering angles 206. A first amplitude response 306-1 and a first phase response 308-1 are shown for the object 202 positioned at a first angular position 310-1. Likewise, a second amplitude response 306-1 and a second phase response 308-2 are shown for the object 202 positioned at a second angular position 310-2. In this example, the differences are considered across angles between −180 degrees and 180 degrees.

As shown in the amplitude plot 302, an ambiguous zone exists for the two angular positions 310-1 and 310-2. In this example, the first amplitude response 306-1 (shown via the solid line) has a highest peak at the first angular position 310-1 and a lesser peak at the second angular position 310-2. While the highest peak corresponds to the actual position of the object 202, the lesser peak causes the angular position of the object 202 to be ambiguous. In contrast, the second amplitude response 306-2 (shown via the dotted-line) has a lesser peak at the second angular position 310-2 and a higher peak at the first angular position 310-1. In this case, the lesser peak corresponds to the object 202's location and the higher peak causes the angular position of the object 202 to be ambiguous.

Both of these amplitude responses 306-1 and 306-2 illustrate different angular ambiguities that can be solved by analyzing subtle differences in the shapes of the amplitude responses 306 using machine learning. Characteristics of the shape can include, for example, the roll-offs, peak or null widths, angular location of the peaks or nulls, and/or the height or depth of the peaks and nulls. In general, the peaks and nulls occur where a derivative of the amplitude response is zero. The characteristics of the shape can also be associated with a sidelobe, which represents another peak that has less amplitude than a highest peak within the field of view. Additional shape characteristics can also be considered, such as symmetry, or the lack of symmetry. Similar shape characteristics can be analyzed in the phase plot 304. The shapes of the phase responses 308-1 and 308-2 can provide additional information for distinguishing the actual location of the object 202. Based on these analyzed shapes, the angular position of the object 202 can be determined. Some of the peaks and nulls are identified in the amplitude plot 302 and the phase plot 304 of FIG. 3. Because it is challenging to design closed-form signal-processing algorithms that can analyze these irregular shapes, the described techniques use machine learning to map these unique angular responses or patterns to different angular positions of the object.

Figure 4:
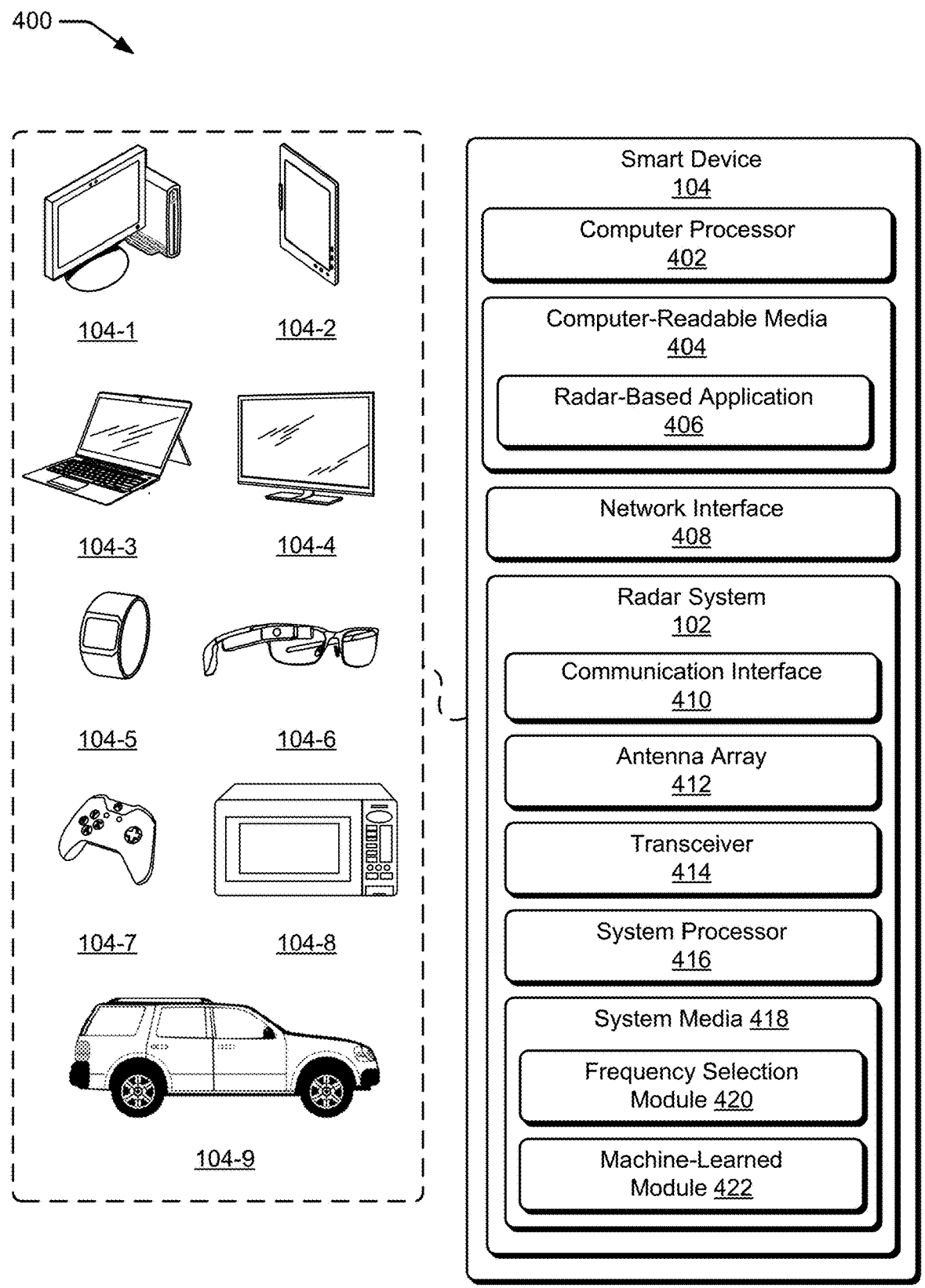
FIG. 4 illustrates an example implementation of a radar system as part of a smart device.

In more detail, consider FIG. 4, which illustrates the radar system 102 as part of the smart device 104. The smart device 104 is illustrated with various non-limiting example devices including a desktop computer 104-1, a tablet 104-2, a laptop 104-3, a television 104-4, a computing watch 104-5, computing glasses 104-6, a gaming system 104-7, a microwave 104-8, and a vehicle 104-9. Other devices may also be used, such as a home service device, a smart speaker, a smart thermostat, a security camera, a baby monitor, a router, a drone, a track pad, a drawing pad, a netbook, an e-reader, a home-automation and control system, a wall display, and another home appliance. Note that the smart device 104 can be wearable, non-wearable but mobile, or relatively immobile (e.g., desktops and appliances). The radar system 102 can be used as a stand-alone radar system or used with, or embedded within, many different smart devices 104 or peripherals, such as in control panels that control home appliances and systems, in automobiles to control internal functions (e.g., volume, cruise control, or even driving of the car), or as an attachment to a laptop computer to control computing applications on the laptop.

The smart device 104 includes one or more computer processors 402 and computer-readable media 404, which includes memory media and storage media. Applications and/or an operating system (not shown) embodied as computer-readable instructions on the computer-readable media 404 can be executed by the computer processor 402 to provide some of the functionalities described herein. The computer-readable media 404 also includes a radar-based application 406, which uses radar data generated by the radar system 102 to perform a function, such as presence detection, gesture-based touch-free control, collision avoidance for autonomous driving, human vital-sign notification, and so forth.

The smart device 104 may also include a network interface 408 for communicating data over wired, wireless, or optical networks. For example, the network interface 408 may communicate data over a local-area-network (LAN), a wireless local-area-network (WLAN), a personal-area-network (PAN), a wire-area-network (WAN), an intranet, the Internet, a peer-to-peer network, point-to-point network, a mesh network, and the like. The smart device 104 may also include a display (not shown).

The radar system 102 includes a communication interface 410 to transmit the radar data to a remote device, though this need not be used when the radar system 102 is integrated within the smart device 104. In general, the radar data provided by the communication interface 410 is in a format usable by the radar-based application 406.

The radar system 102 also includes at least one antenna array 412 and at least one transceiver 414 to transmit and receive the radar signal 208. The antenna array 412 includes at least one transmit antenna element and at least two receive antenna elements. In some situations, the antenna array 412 includes multiple transmit antenna elements to implement a multiple-input multiple-output (MIMO) radar capable of transmitting multiple distinct waveforms at a given time (e.g., a different waveform per transmit antenna element). The antenna elements can be circularly polarized, horizontally polarized, vertically polarized, or a combination thereof.

The receive antenna elements of the antenna array 412 can be positioned in a one-dimensional shape (e.g., a line) or a two-dimensional shape (e.g., a rectangular arrangement, a triangular arrangement, or an "L" shape arrangement) for implementations that include three or more receive antenna elements. The one-dimensional shape enables the radar system 102 to measure one angular dimension (e.g., an azimuth or an elevation) while the two-dimensional shape enables the radar system 102 to measure two angular dimensions (e.g., to determine both an azimuth angle and an elevation angle of the object 202). An element spacing associated with the receive antenna elements can be less than, greater than, or equal to half a center wavelength of the radar signal 208.

Using the antenna array 412, the radar system 102 can form beams that are steered or un-steered, wide or narrow, or shaped (e.g., hemisphere, cube, fan, cone, cylinder). The steering and shaping can be achieved through digital beamforming. The one or more transmitting antenna elements can have an un-steered omnidirectional radiation pattern or can produce a wide steerable beam to illuminate a large volume of space. To achieve target angular accuracies and angular resolutions, the receiving antenna elements can be used to generate hundreds or thousands of narrow steered beams with digital beamforming. In this way, the radar system 102 can efficiently monitor an external environment and detect one or more users.

The transceiver 414 includes circuitry and logic for transmitting and receiving radar signals 208 via the antenna array 412. Components of the transceiver 414 can include amplifiers, mixers, switches, analog-to-digital converters, filters, and so forth for conditioning the radar signals 208. The transceiver 414 also includes logic to perform in-phase/quadrature (I/Q) operations, such as modulation or demodulation. A variety of modulations can be used, including linear frequency modulations, triangular frequency modulations, stepped frequency modulations, or phase modulations. Alternatively, the transceiver 414 can produce radar signals 208 having a relatively constant frequency or a single tone. The transceiver 414 can be configured to support continuous-wave or pulsed radar operations.

A frequency spectrum (e.g., range of frequencies) that the transceiver 414 can use to generate the radar signals 208 can encompass frequencies between 1 and 400 GHz, between 4 and 100 GHz, between 1 and 24 GHz, between 2 and 4 GHz, between 57 and 63 GHz, or at approximately 2.4 GHz. In some cases, the frequency spectrum can be divided into multiple sub-spectrums that have a similar or different bandwidths. The bandwidths can be on the order of 500 megahertz (MHz), one gigahertz (GHz), two gigahertz, and so forth. Different frequency sub-spectrums may include, for example, frequencies between approximately 57 and 59 GHz, 59 and 61 GHz, or 61 and 63 GHz. Although the example frequency sub-spectrums described above are contiguous, other frequency sub-spectrums may not be contiguous. To achieve coherence, multiple frequency sub-spectrums (contiguous or not) that have a same bandwidth may be used by the transceiver 414 to generate multiple radar signals 208, which are transmitted simultaneously or separated in time. In some situations, multiple contiguous frequency sub-spectrums may be used to transmit a single radar signal 208, thereby enabling the radar signal 208 to have a wide bandwidth.

The radar system 102 also includes one or more system processors 416 and a system media 418 (e.g., one or more computer-readable storage media). The system media 418 includes a frequency selection module 420, which selects the one or more frequency sub-spectrums that are used to transmit the radar signal 208. In some cases, the frequency sub-spectrum is selected based on the receive antenna element spacing to increase the amplitude and phase differences between at least two different steering angles 206 compared to another frequency sub-spectrum. In general, the frequency sub-spectrums that are selected enhance and emphasize the differences, thereby making it easier to resolve angular ambiguities via machine learning. Two example frequency selection techniques include single-frequency sub-spectrum selection and multiple-frequency sub-spectrum, which are further described below.

For single-frequency sub-spectrum selection, the frequency selection module 420 chooses one of the frequency sub-spectrums that reduces a quantity or amplitude of the sidelobes 214. The amplitude may be reduced, for example, by half a decibel, one decibel, or more. In some cases, the frequency sub-spectrum is chosen based on a known antenna element spacing, which can be stored in the system media 418 of the radar system 102 or the computer-readable media 404 of the smart device 104. Single-frequency sub-spectrum selection is further described with respect to FIG. 6-1.

For multiple-frequency sub-spectrum selection, the frequency selection module 420 chooses at least two frequency sub-spectrums for transmitting the radar signal 208. In this situation, the frequency sub-spectrums that are selected have a same bandwidth for coherence. The multiple frequency sub-spectrums can be transmitted simultaneously or separated in time using a single radar signal 208 or multiple radar signals 208. The selected frequency sub-spectrums may be contiguous or non-contiguous. Contiguous frequency sub-spectrums enable the radar signal 208 to have a wider bandwidth and non-contiguous frequency sub-spectrums can further emphasize the amplitude and phase differences between different steering angles 206.

The multiple-frequency sub-spectrum selection enables different distributions of the angular ambiguities to be realized for different frequency sub-spectrums. While shapes and characteristics of the angular ambiguities may change based on the frequency sub-spectrum, a main peak that is associated with the object 202 remains with a similar shape across different frequency sub-spectrums. Generally speaking, the farther the frequency sub-spectrums are separated with respect to one another, the easier it is for the machine learning to resolve the angular ambiguities. A quantity of frequency sub-spectrums can be determined based on a target angular accuracy or computational limitations of the radar system 102. The frequency selection module 420 causes the transceiver 414 to transmit the radar signal 208 using the selected frequency sub-spectrum or sub-spectrums. Multiple-frequency sub-spectrum selection is further described with respect to FIG. 6-2.

The system media 418 also includes a machine-learned module 422, which enables the system processor 416 to process the responses from the antenna elements in the antenna array 412 to detect the object 202 and determine the angular position of the object 202. In other implementations, the computer-readable media 404 can include the machine-learned module 422. This enables the radar system 102 to provide the smart device 104 raw data via the communication interface 410 such that the computer processor 402 can execute the machine-learned module 422. In general, the machine-learned module 422 uses a trained regression model to analyze the shape of the spatial response, as shown in FIG. 2, and map the unique angular signature or pattern to angular probability data. The machine-learned module 422 can include a suite of networks that can be individually selected according to the type of smart device 104 or a target angular resolution for the radar-based application 406.

In some implementations, the machine-learned module 422 relies on supervised learning and can use measured (e.g., real) data for machine-learning training purposes. Training enables the machine-learned module 422 to learn a non-linear mapping function for translating beamforming data into angular probability data. In other implementations, the machine-learned module 422 relies on unsupervised learning to determine the non-linear mapping function.

An example offline training procedure uses a motion-capture system to generate truth data for training the machine-learned module 422. The motion-capture system can include multiple optical sensors, such as infrared-sensors or cameras, and measures positions of multiple markers that are placed on different portions of a person's body, such as on an arm, a hand, a torso, or a head. While the person moves to different angular positions relative to the radar system 102, radar data from the radar system 102 and position data from the motion-capture system are recorded.

The radar data represents training data and can include raw radar data or processed radar data (e.g., beamforming data). The position data recorded from the motion-capture system is converted into angular measurements with respect to the radar system 102 and represents truth data. The truth data and the training data are synchronized in time, and provided to the machine-learned module 422. The machine-learned module estimates angular positions of the person based on the training data, and determines amounts of error between the estimated angular positions and the truth data. The machine-learned module adjusts machine-learning parameters (e.g., weights and biases) to minimize these errors. Based on this offline training procedure, the determined weights and biases are pre-programmed into the machine-learned module 422 to enable subsequent angular estimation using machine learning. In some cases, the offline training procedure can provide a relatively noise-free environment and high-resolution truth data for training the machine-learned module 422.

Additionally or alternatively, a real-time training procedure can use available sensors within the smart device 104 to generate truth data for training the machine-learned module 422. In this case, a training procedure can be initiated by a user of the smart device 104. While the user moves around the smart device 104, data from optical sensors (e.g., a camera or an infra-red sensor) of the smart device 104 and the radar system 102 are collected and provided to the machine-learned module 422. The machine-learned module 422 determines or adjusts machine-learning parameters to minimize errors between the estimated angular data and the truth data. Using the real-time training procedure, the machine-learned module 422 can be tailored to the user, account for current environmental conditions, and account for a current position or orientation of the smart device 104.

The machine-learned module 422 can include one or more artificial neural networks (referred to herein as neural networks). A neural network includes a group of connected nodes (e.g., neurons or perceptrons), which are organized into one or more layers. As an example, the machine-learned module 422 includes a deep neural network, which includes an input layer, an output layer, and one or more hidden layers positioned between the input layer and the output layers. The nodes of the deep neural network can be partially-connected or fully connected between the layers.

In some cases, the deep neural network is a recurrent deep neural network (e.g., a long short-term memory (LSTM) recurrent deep neural network) with connections between nodes forming a cycle to retain information from a previous portion of an input data sequence for a subsequent portion of the input data sequence. In other cases, the deep neural network is a feed-forward deep neural network in which the connections between the nodes do not form a cycle. Additionally or alternatively, the machine-learned module 422 can include another type of neural network, such as a convolutional neural network. An example deep neural network is further described with respect to FIG. 7. The machine-learned module 422 can also include one or more types of regression models, such as a single linear regression model, multiple linear regression models, logistic regression models, step-wise regression models, multi-variate adaptive regression splines, locally estimated scatterplot smoothing models, and so forth.

Generally, a machine-learning architecture of the machine-learned module 422 can be tailored based on available power, available memory, or computational capability. The machine-learning architecture can also be tailored based on a quantity of angular positions the radar system 102 is designed to recognize or a quantity of angular ambiguities the radar system 102 is designed to resolve. The machine-learned module 422 can implement, at least partially, angular estimation using machine learning, which is further described with respect to FIG. 5.

Figure 5:
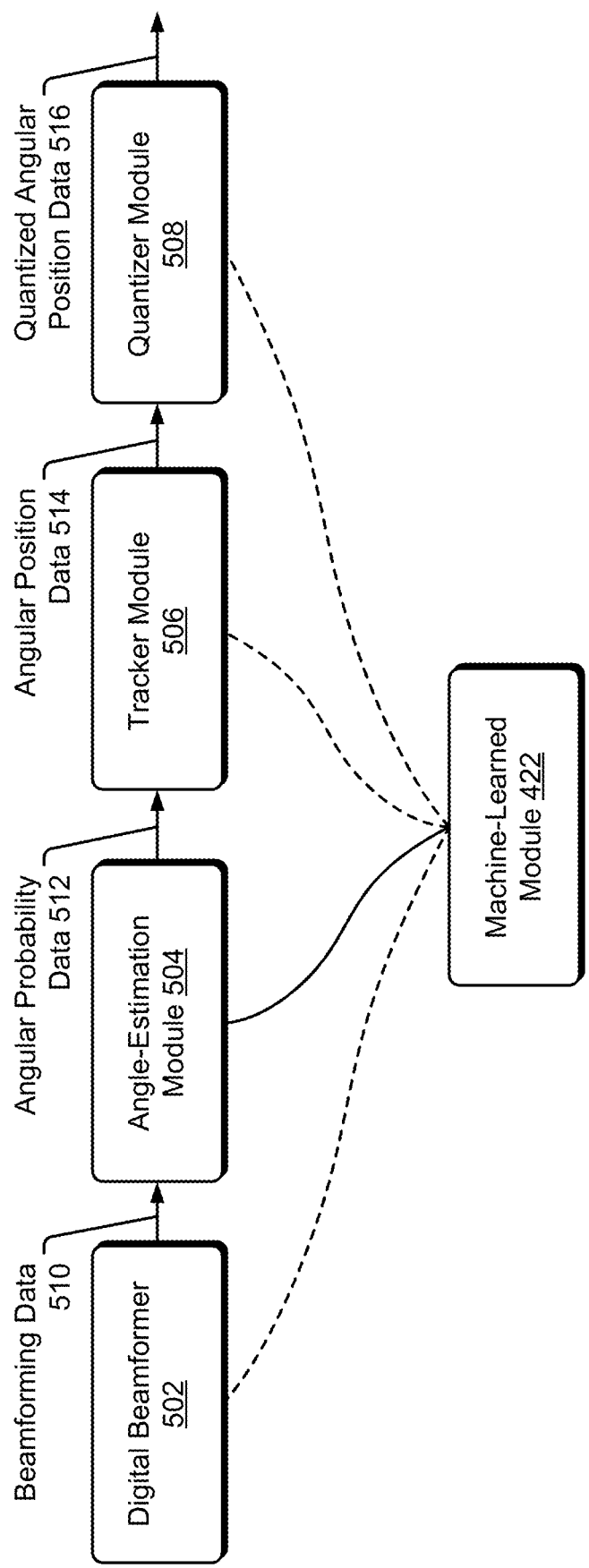
FIG. 5 illustrates an example scheme implemented by a radar system for performing angular estimation using machine learning.

FIG. 5 illustrates an example scheme implemented by the radar system 102 for performing angular estimation using machine learning. In the depicted configuration, the radar system 102 includes a digital beamformer 502, an angle-estimation module 504, a tracker module 506, and a quantizer module 508. At least the angle-estimation module 504 is implemented by the machine-learned module 422. In some implementations, the machine-learned module 422 also implements the digital beamformer 502, the tracker module 506, the quantizer module 508 or combinations thereof. Alternatively, the digital beamformer 502, the tracker module 506, or the quantizer module 508 are implemented using conventional signal-processing algorithms. In some cases, operations of the tracker module 506 or the quantizer module 508 are integrated within the angle-estimation module 504.

The digital beamformer 502 obtains the multiple responses from the antenna elements in the antenna array 412 and generates beamforming data 510. The beamforming data 510 can include spatial responses, such as the spatial response 210 shown in FIG. 2 or phase coherence maps, which are further described in FIG. 6-2. The beamforming data 510 can include a single-dimensional or multi-dimensional matrix for a quantity of beams at multiple range positions. To reduce a quantity of down-stream computations within the angle-estimation module 504, two orthogonal vectors of the multiple beams can be provided as the beamforming data 510. The beamforming data 510 can also include amplitude information (e.g., real numbers) or both amplitude and phase information (e.g., complex numbers). In some cases, the digital beamformer 502 executes a Fourier beamforming algorithm, a minimum various distortionless response (MVDR) (e.g., Capon) beamforming algorithm, a multiple signal classification (MUSIC) beamforming algorithm, estimation of signal parameters via rotational invariance techniques (ESPRIT), a compressive sensing-based beamforming algorithm, a parametric algorithm, a non-parametric algorithm, a linear beamforming algorithm, a non-linear beamforming algorithm, and so forth.

If the digital beamformer 502 is implemented within the machine-learned module 422, the digital beamformer 502 employs machine-learning techniques to generate the beamforming data 510. In this case, the digital beamformer 502 can be implemented using one or more layers of a neural network. Although the activation functions within these layers encode the digital beamforming algorithms, the digital beamformer 502 can be trained to tune and adjust beamforming weights (e.g., machine-learning parameters) based on a performance of the radar system 102. In this manner, the digital beamformer 502 can account for performance discrepancies caused by manufacturing variances, hardware performance variances over time or temperature, a current position or orientation of the smart device 104, current environmental obstacles and noise, and so forth. The machine learning can account for variations in gains of multiple antenna elements across different radar systems 102, different temperatures, or over time, for instance. The training procedure can also enable the digital beamformer 502 to dynamically adjust the beamforming weights according to different use cases, such as different activities of the user or different types of radar-based applications 406.

The angle-estimation module 504 obtains the beamforming data 510 and employs machine-learning techniques to generate angular probability data 512. The angular probability data 512 can include a continuous probability distribution across 360 degrees or a probability distribution across two or more angular bins. In some implementations, the probability distribution comprises a gaussian distribution. The angular bins can encompass a few course angular intervals or many fine angular intervals. In some cases, the user can exist within multiple angular bins. An angular resolution and a quantity of the angular bins can be adjusted based on the radar-based application 406 or computational capability of the radar system 102 or smart device 104.

The angle-estimation module 504 can include a neural network, a convolutional neural network (CNN), a long short-term memory network, or combinations thereof. The neural network can have various depths or quantities of hidden layers (e.g., three hidden layers, five hidden layers, or ten hidden layers). The neural network can also include a variety of different quantities of connections. For example, the neural network can be implemented with fully-connected neural network layers or a partially-connected neural network layers. These connections enable the angle-estimation module 504 to use both local and global knowledge to analyze the beamforming data 510. In some cases, a convolutional neural network can be used to increase computational speed of the angle-estimation module 504. In other cases in which it is advantageous to reference temporal information or previously measured angular positions of the object 202, the long short-term memory network can be used. With inclusion of a long short-term memory layer, the angle-estimation module 504 can also learn to track the object 202. In general, the angle-estimation module 504 employs non-linear functions to map the beamforming data 510 to the angular probability data 512.

The tracker module 506 produces angular position data 514 based on the angular probability data 512. The angular position data 514 can include the angular bin that the tracker module 506 determines the object 202 to be within. In general, the tracker module 506 selects the angular bin that has a highest probability of corresponding to the object 202. The selection can be based on which angular bin has a highest probability in the angular probability data 512. The tracker module 506 can also make the determination based on at least one previously-measured angular position. This can enable the radar system 102 to keep track of one or more moving objects 202 and increase confidence in angular measurements and object detection. In some cases, the tracker module 506 can predict the angular position of the object 202 and select the angular bin that closely corresponds to the prediction. Other data can also be used to determine the angular position, including range, Doppler, velocity, or acceleration. In some cases, the tracker module 506 can implement an alpha-beta tracker, a Kalman filter, a multiple hypothesis tracker (MHT), and so forth.

If the tracker module 506 is implemented within the machine-learned module 422, the tracker module 506 employs machine-learning techniques to generate the angular position data 514. In this case, the tracker module 506 can be implemented using one or more long-short term memory network layers. The tracker module 506 can also be trained to distinguish an angular ambiguity of a first user from an angular signature of a second user. In this way, the radar system 102 can detect multiple objects in the presence of angular ambiguities. The tracker module 506 can also identify the user after a period of time in which the user is not detected by the radar system 102.

The quantization module 508 obtains the angular position data 514 and quantizes the data to produce quantized angular position data 516. The quantization can be performed based on a target angular resolution for the radar-based application 406. In some situations, fewer quantization levels can be used such that the quantized angular position data 516 indicates whether the object 202 is to the right or to the left of the smart device 104 or identifies a 90 degree quadrant the object 202 is located within. This may be sufficient for some radar-based applications 406, such as user proximity detection. In other situations, a larger number of quantization levels can be used such that the quantized angular position data 516 indicates an angular position of the object 202 within an accuracy of a fraction of a degree, one degree, five degrees, and so forth. This resolution can be used for higher-resolution radar-based applications 406, such as gesture recognition.

If the quantization module 508 is implemented within the machine-learned module 422, the quantization module 508 employs machine-learning techniques to generate the quantized angular position data 516. In this case, the quantization module 508 can be implemented using one or more neural network layers.

Figures 1, 6:
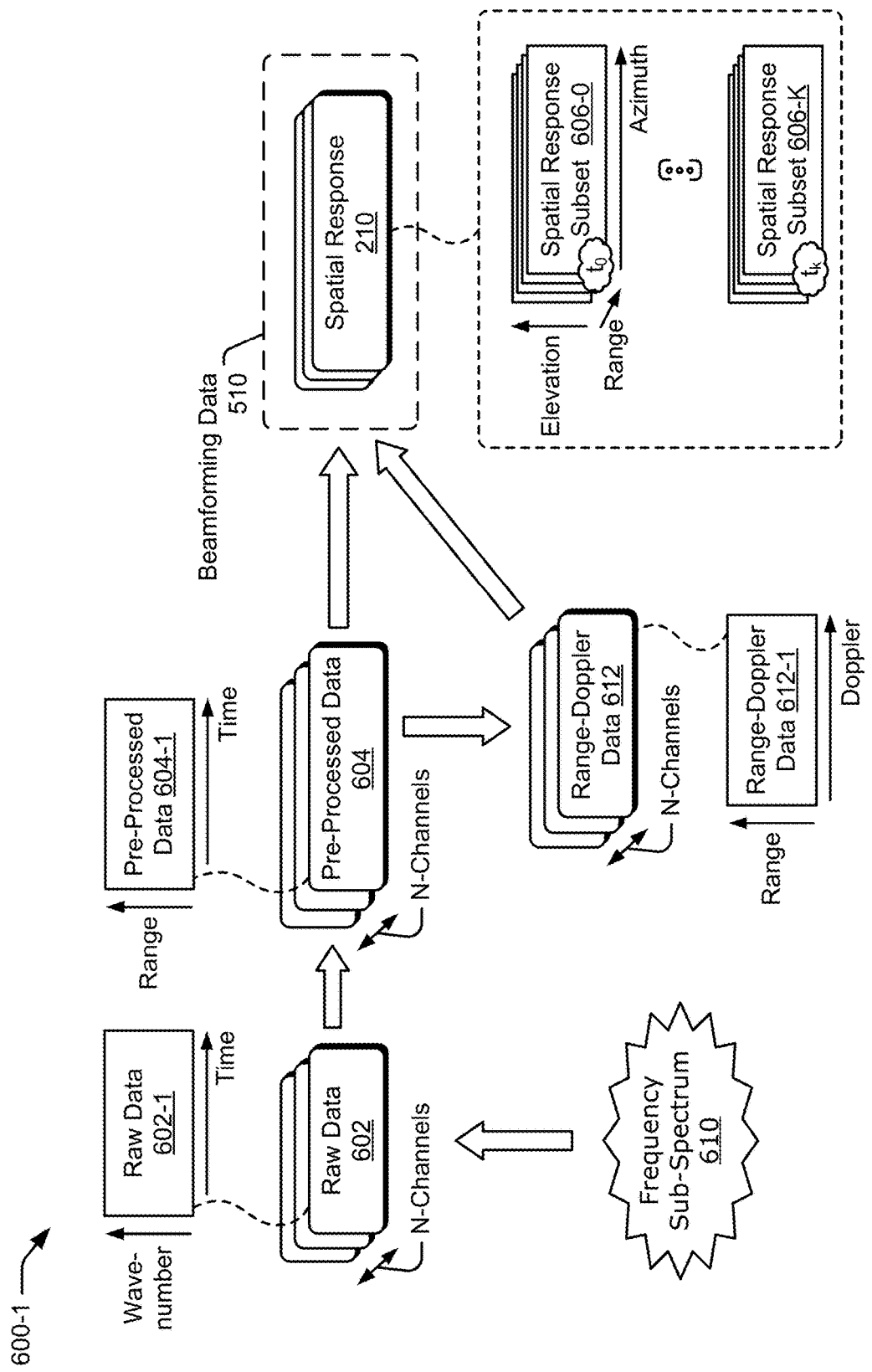
Figures 2, 6:
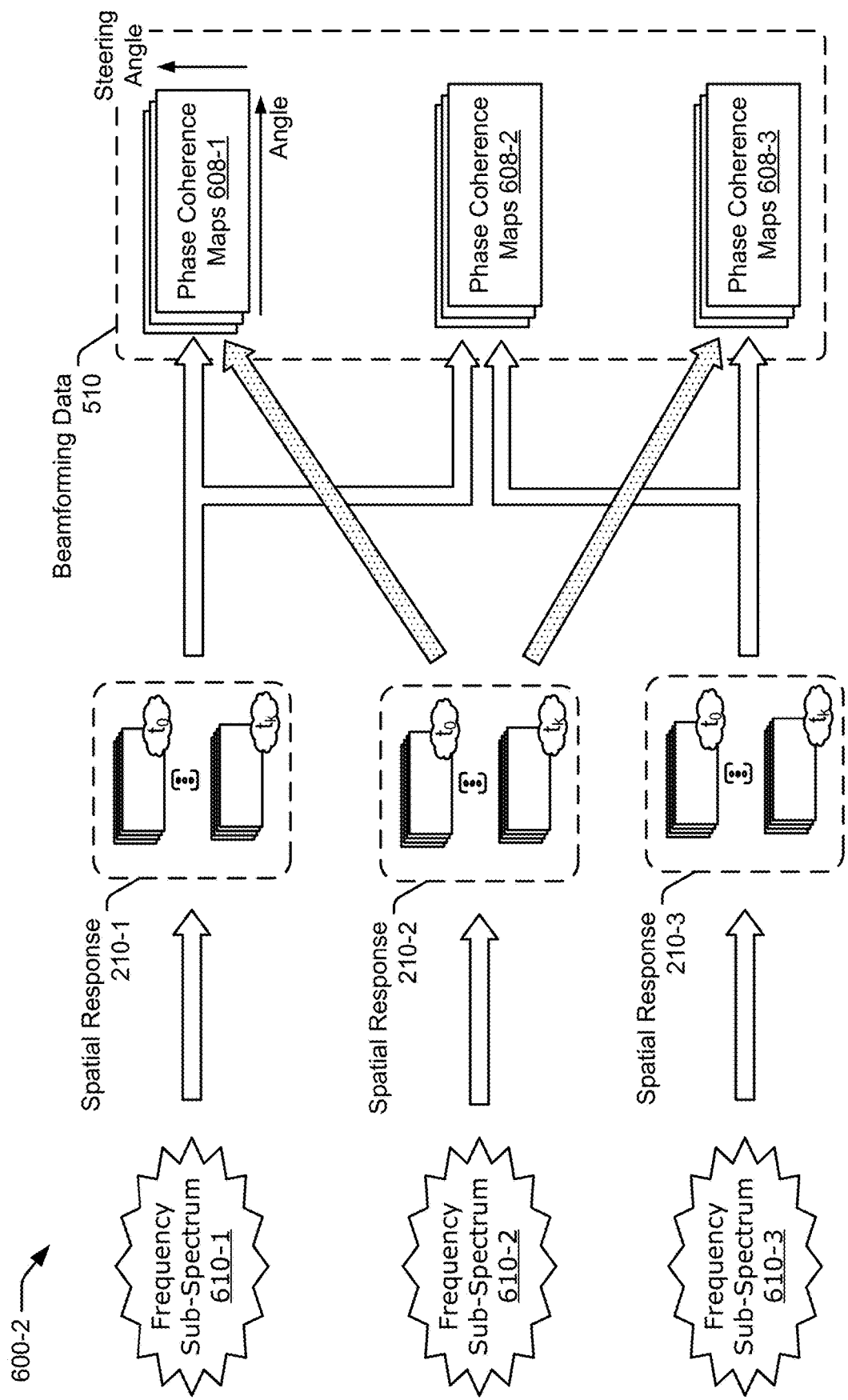

FIG. 6-1 illustrates an example scheme 600-1 implemented by the digital beamformer 502 for performing angular estimation using machine learning. In the scheme 600-1, a single frequency sub-spectrum 610 is selected via the frequency selection module 420 and is present in the radar signal 208 of FIG. 2. The digital beamformer 502 obtains, from the transceiver 414, raw data 602, which represents digital responses from each of the antenna elements of the antenna array 412 that are used to receive the radar signal 208. In general, the responses from each of the antenna elements are processed by separate receive channels in the transceiver 414, which are represented by N-channels in FIG. 6-1, where N represents a positive integer. The raw data 602 contains digital information (e.g., in-phase and quadrature data) across a period of time and for different wavenumbers associated with the radar signal 208, as shown by raw data 602-1, which is associated with one of the N-channels. The digital beamformer 502 performs a Fast-Fourier Transform (FFT) on the raw data 602 to generate pre-processed data 604. The pre-processed data 604 includes digital information across the period of time and for different ranges (e.g., range bins), as shown by pre-processed data 604-1, which is associated with one of the N-channels. In some implementations, the digital beamformer 502 performs another FFT operation on the pre-processed data 604 to generate range-Doppler data 612. The range-Doppler data 612 includes digital information for different Doppler frequencies and for the different ranges, as shown by range-Doppler data 612-1, which is associated with one of the N-channels.

Using either the pre-processed data 604 or the range-Doppler data 612, the digital beamformer 502 generates the spatial response 210 by combining information across the N-channels. The spatial response 210 includes amplitude and phase information, examples of which are illustrated in FIGS. 2 and 3. In FIG. 6-1, the spatial response 210 includes spatial response subsets 606-0 through 606-K, which include a set of spatial responses 210 for different time intervals, such as time t0 and time $t_k$. The variable K represents a positive integer. Each spatial response 210 within the spatial response subset 606 contains digital information for a set of azimuths, elevations, and ranges. The set of azimuths and elevations represent the field of view 212 for which different steering angles or beams are formed by the digital beamformer 502. As an example, the digital beamformer 502 can generate approximately 100 beams, 2000 beams, 4000 beams, 6000 beams, and so forth.

In the scheme 600-1, the beamforming data 510, which is provided to the angle-estimation module 504 of FIG. 5, includes the spatial response 210. In some cases, a portion of the spatial response 210 can be provided to reduce the number of computations in the angle-estimation module 504. The portion can be, for instance, based on a range slice that has a higher probability of being associated with a range to the object (e.g., includes a maximum amplitude response compared to the other ranges). Another type of beamforming data 510 is further described with respect to FIG. 6-2.

FIG. 6-2 illustrates another example scheme 600-2 implemented by the digital beamformer 502 for performing angular estimation using machine learning. In the scheme 600-2, three frequency sub-spectrums 610-1, 610-2, and 610-3 are selected via the frequency selection module 420 and are present in the radar signal 208 of FIG. 2. Similar to the scheme 600-1 in FIG. 6-1, spatial responses 210-1, 210-2, and 210-3 are respectively generated for each of the frequency sub-spectrums 610-1, 610-2, and 610-3. Complex coherence is performed on these spatial responses 210-1, 210-2, and 210-3 to generate phase coherence maps 608-1, 608-2, and 608-3. The phase coherence maps 608 contain phase information of the complex coherence (e.g., interferogram) between pairs of beamforming reconstructions. As shown by the arrows in FIG. 6-2, the phase coherence maps 608-1, 608-2, and 608-3 are respectively computed using the spatial responses 210 associated with the frequency sub-spectrum 610-1 and 610-2, the frequency sub-spectrums 610-1 and 610-3, and the frequency sub-spectrums 610-2 and 610-3. The phase information in the phase coherence maps 608 is computed according to Equation 1:

$$\theta = \frac{\text{Angle}(E\{S_1 S_2^*\})}{\sqrt{E\{|S_1|^2\}E\{|S_2|^2\}}} \quad \text{Equation 1}$$

where $S_n$ represents a signal received by antenna element n, $E\{\ \}$ represents an expected value estimation, and "*" represents a complex conjugate.

In the scheme 600-2, the beamforming data 510, which is provided to the angle-estimation module 504 of FIG. 5, includes the phase coherence maps 608-1, 608-2, and 608-3. In general, a portion of the spatial response 210 that is associated with the object 202 remains with a similar shape in each of the different frequency sub-spectrums 610 while shapes of the angular ambiguities can differ. As such, the object 202's position can be determined by analyzing the phase coherence maps 608. In other words, different angular positions of the object within the field of view 212 have a unique phase coherence map 608, which can be identified by the angular estimation module 504.

Figure 7:
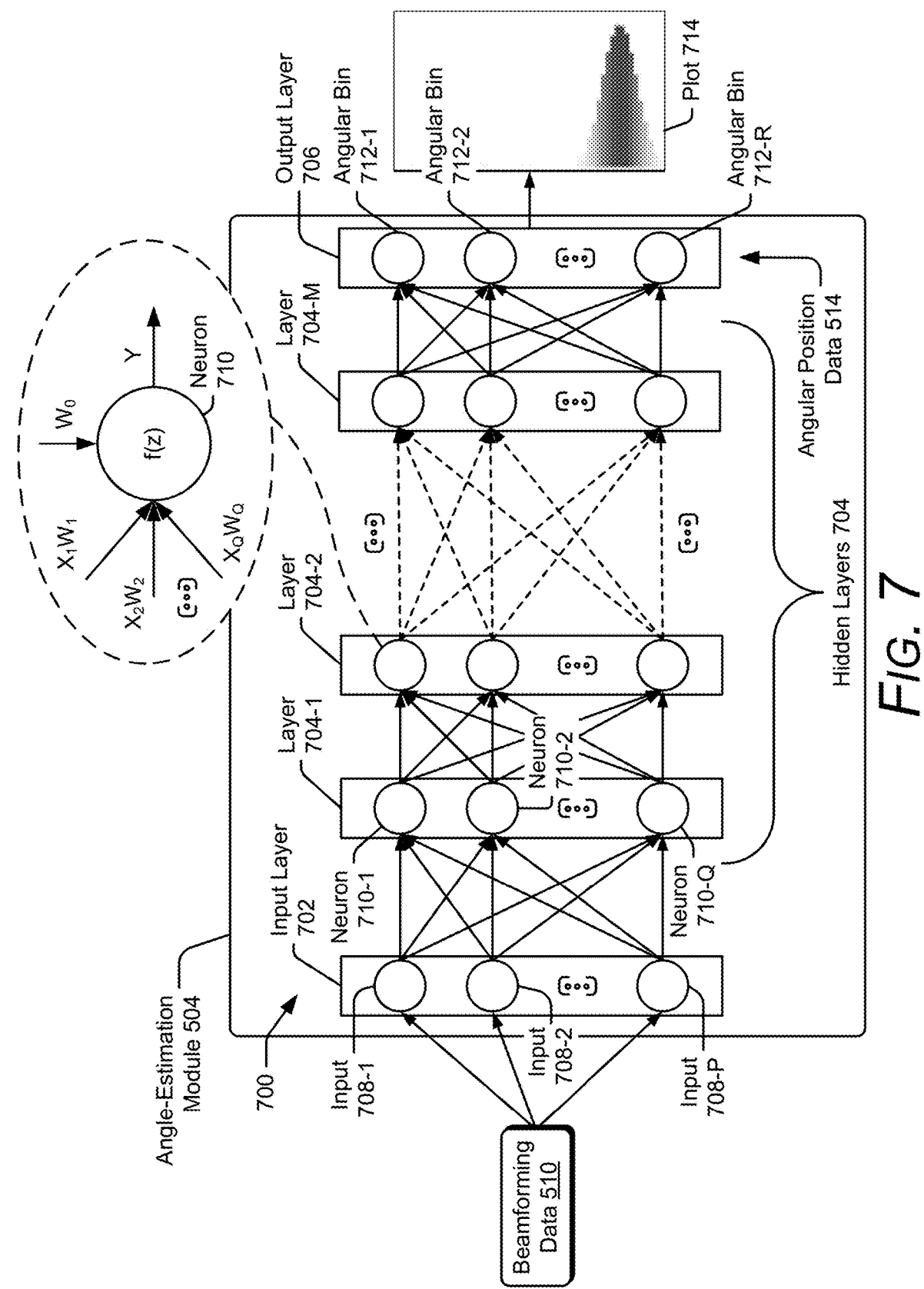
FIG. 7 illustrates an example neural network for performing angular estimation using machine learning.

FIG. 7 illustrates an example neural network 700 for performing angular estimation using machine learning. In the depicted configuration, the neural network 700 implements the angle-estimation module 504. The neural network 700 includes an input layer 702, multiple hidden layers 704, and an output layer 706. The input layer 702 includes multiple inputs 708-1, 708-2 . . . 708-P, where P represents a positive integer. The multiple hidden layers 704 include layers 704-1, 704-2 . . . 704-M, where M represents a positive integer. Each hidden layer 704 includes multiple neurons, such as neurons 710-1, 710-2 . . . 710-Q, where Q is a positive integer. Each neuron 710 is connected to at least one other neuron 710 in a next hidden layer 704. A quantity of neurons 710 can be similar or different for different hidden layers 704. In some cases, a hidden layer 704 can be a replica of a previous layer (e.g., layer 704-2 can be a replica of layer 704-1). The output layer 706 includes angular bins 712-1, 712-2 . . . 712-R, where R represents a positive integer. A variety of different neural networks 700 can be used with various quantities of inputs 708, hidden layers 704, neurons 710, and angular bins 712.

As shown in FIG. 7, the beamforming data 510 is provided to the input layer 702. Assuming the beamforming data 510 is a 64×64 matrix of amplitudes and a quantity of inputs 708 is 512, eight contiguous elements of the matrix can be combined and provided to each of the inputs 708. In general, each neuron 710 in the hidden layers 704 analyzes a different section or portion of the beamforming data 510 via an activation function. The neuron 710 activates (or inversely activates) when a specific type of feature is detected at a spatial position in the beamforming data 510. An example activation function can include, for example, a non-linear function such as a hyperbolic tangent function. Towards the top of FIG. 7, a neuron 710 is shown to obtain inputs $X_1 W_1, X_2 W_2 \ldots X_Q W_Q$ and a bias $W_0$, where $X_1, X_2 \ldots X_Q$ correspond to outputs of a previous input or hidden layer (e.g., the layer 704-1 in FIG. 7) and $W_1, W_2 \ldots W_Q$ correspond to respective weights that are applied to $X_1, X_2 \ldots X_Q$. An output Y that is generated by the neuron 710 is determined based on the activation function $f(z)$. An example hyperbolic tangent activation function is shown in Equation 2 below:

$$Y = f(z) = \frac{e^z - e^{-z}}{e^z + e^{-z}} \quad \text{Equation 2}$$

where z is represented by Equation 3 below:

$$z = W_0 + \Sigma_i^P X_i W_i \quad \text{Equation 3}$$

where P is a positive integer that represents a quantity of inputs to the neuron 710. In the depicted example, P is equal to Q for a fully-connected network. The output Y can be scaled by another weight and provided as an input to another layer 704 or the output layer 706 (e.g., the layer 704-M in FIG. 7).

At the output layer 706, the hidden layers 704 provide a probability of the object 202 being located within each of the angular bins 712-1 to 712-R. As an example, a quantity of angular bins 712-1 to 712-R is 64. An example plot 714 illustrates example probabilities for each of the angular bins 712-1 to 712-R. With training, the neural network 700 can learn any number of unique angular signatures, including hundreds or thousands of different patterns. Other types of machine-learning architectures can also be used to implement the angle-estimation module 504, such as a convolutional neural network as described with respect to FIG. 8.

Figure 8:
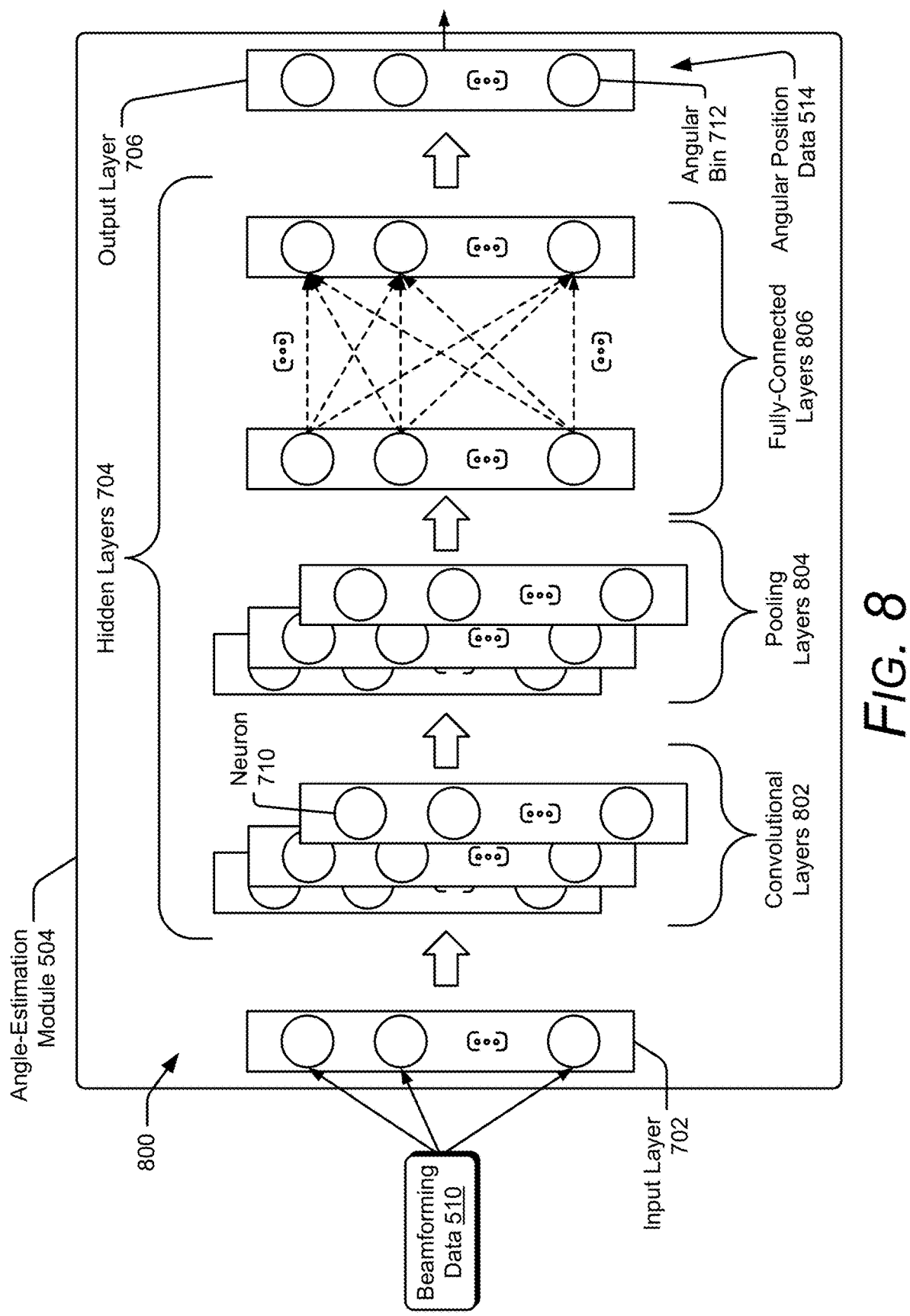
FIG. 8 illustrates an example convolutional neural network for performing angular estimation using machine learning.

FIG. 8 illustrates an example convolutional neural network 800 for performing angular estimation using machine learning. In the depicted configuration, the convolutional neural network 800 implements the angle-estimation module 504. The general operation of the convolutional neural network 800 is similar to the neural network 700 (of FIG. 7) in that the beamforming data 510 is provided to neurons within the hidden layers 704 and probabilities for different angular bins are generated at the output layer 706. The hidden layers 704 are structured differently in the convolutional neural networks 800, however. In particular, the hidden layers 704 include convolutional layers 802, pooling layers 804, and fully-connected layers 806.

The convolutional layers 802 perform a convolution operation on the incoming data using learned filters (e.g., kernels) to extract features of the beamforming data 510. Due to the convolution operation, the convolutional layers 802 can extract these features using fewer machine-learning parameters relative to the hidden layers 704 of the neural network 700. With fewer machine-learning parameters, a training procedure of the convolutional neural network 800 can be more efficient than a training procedure of the neural network 700.

A pooling layer 804 aggregates (e.g., combines) outputs of multiple neurons 710 of a previous layer and passes the result to a single neuron of a next layer. The pooling layer 804 can perform an averaging operation or a maximum operation, for instance. By combining clusters of neurons together, outputs of the pooling layers 804 efficiently represent the extracted features and reduce a quantity of computations in subsequent layers. Together, the convolutional layers 802 and the pooling layers 804 enable the convolutional neural network 800 to perform fewer computations compared to the neural network 700 of FIG. 7.

Figure 9:
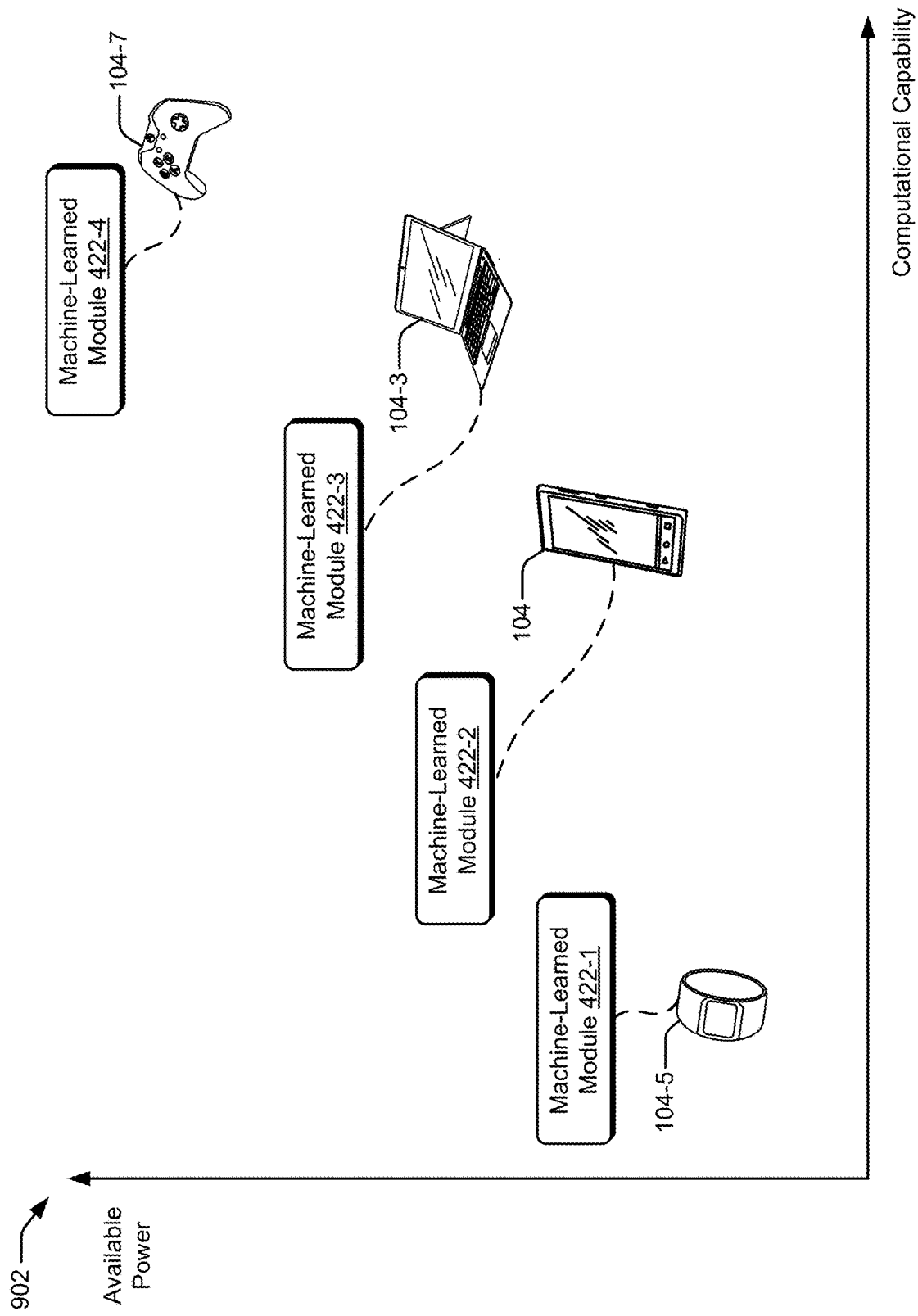
FIG. 9 illustrates an example suite of machine-learned modules that can perform angular estimation for a variety of smart devices.

FIG. 9 illustrates an example suite of machine-learned modules 422 that can perform radar angular estimation for a variety of smart devices 104. The example smart devices 104 in FIG. 4 can vary in terms of available power, computational capability, available memory, types of radar-based applications 406 (e.g., gesture sensing, collision avoidance, vital-sign detection, or proximity detection), and physical size, which can affect a design of the antenna array 412. In FIG. 9, a graph 902 illustrates differences between available power and computational capability for the computing watch 104-5, the smart device 104 of FIG. 1, which is shown as a smart phone, the laptop 104-3, and the gaming system 104-7. In this example, the computing watch 104-5 is shown to have less computational capability and available power compared to the gaming system 104-7.

The suite of machine-learned modules 422 can include machine-learned modules 422-1, 422-2, 422-3, and 422-4, which are designed to operate within the constraints or capabilities of the corresponding smart devices 104-5, 104, 104-3, and 104-7. For example, a low-power, non-computationally intensive machine-learned module 422-1 can be implemented within the computing watch 104-5. To decrease power consumption and a quantity of computations, the machine-learned module 422-1 may evaluate responses across a fewer number of channels or for a fewer number of frequency sub-spectrums 610. The digital beamformer 502 can also generate fewer beams or may provide less beamforming data 510 to the angle-estimation module 504. The angle-estimation module 504 within the machine-learned module 422-1 can have fewer hidden layers 704 and fewer angular bins 712. In other words, a compressed version of the angle-estimation module 504 can be implemented to provide coarse angular estimates. In some cases, a different type of machine-learning architecture can be used to conserve memory and increase a speed of the calculation (e.g., such as the convolutional neural network 800). The radar-based application 406 of the smart watch 104-5 can utilize the angular information provided by the machine-learned module 422-1 for larger-scale radar-based applications 406, such as determining a proximity of a user.

In contrast, a high-power, computationally-intensive machine-learned module 422-4 can be implemented within the gaming system 104-7, which enables the user to perform complex control gestures for a video game. In this case, the machine-learned module 422-4 can process a larger quantity of channels, frequency sub-spectrums 610, or beams. A larger quantity of hidden layers 704 (e.g., such as five) or angular bins 712 can also be implemented within the machine-learned module 422-4. As such, the machine-learned module 422-4 can provide finer angular resolution for a radar-based application 406 such as gesture recognition. The machine-learned module 422-4 can also track the angular positions of multiple objects 202, which may be present at a same time. Example implementations of the machine-learned modules 422-1, 422-2, and 422-4 are further described with respect to FIGS. 10, 11, and 12, respectively.

Figure 10:
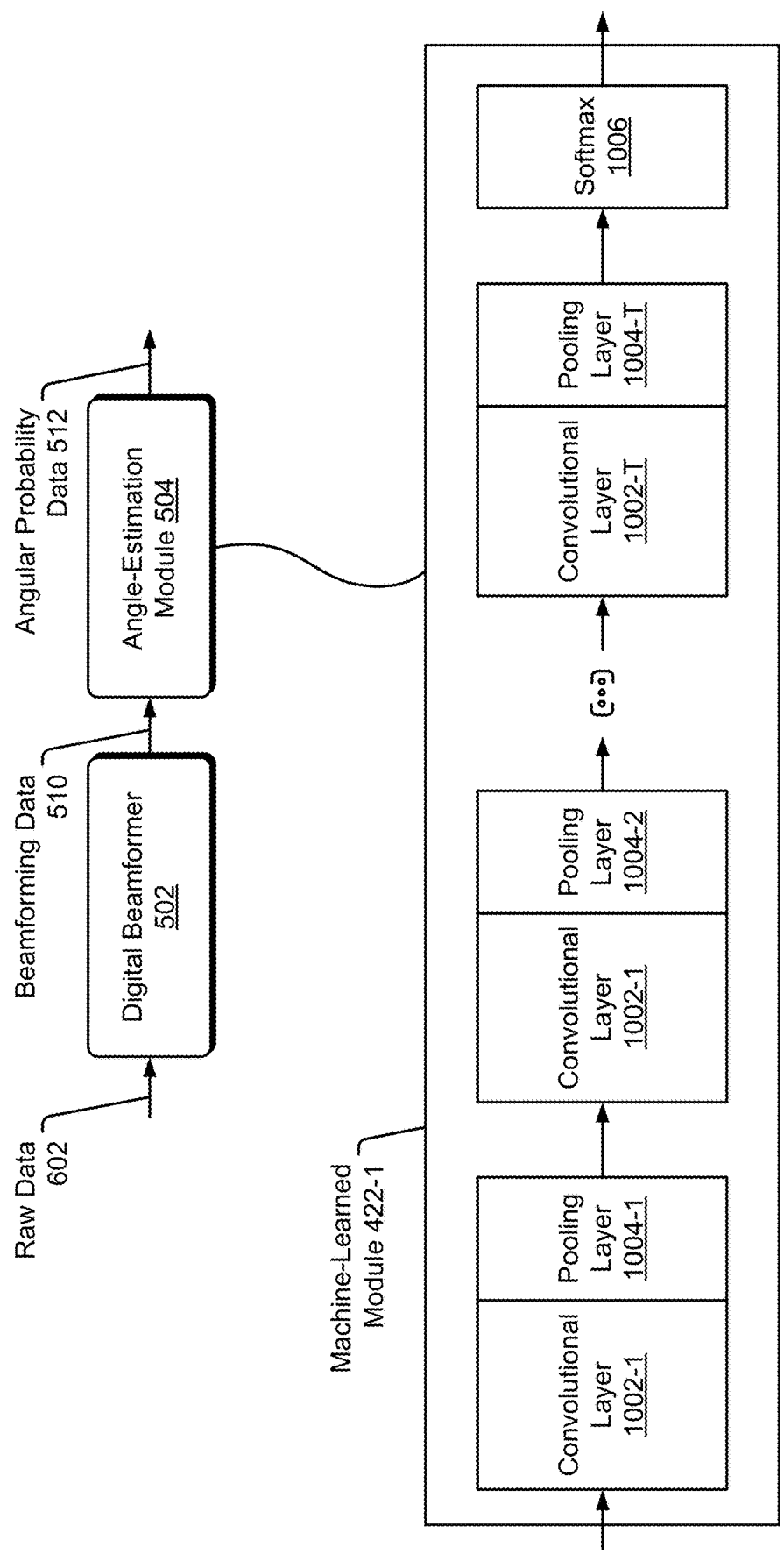
FIG. 10 illustrates an example computationally-conservative machine-learned module.

FIG. 10 illustrates an example computationally-conservative machine-learned module 422-1, which can be implemented within less computationally capable smart devices 104, such as the computing watch 104-5 of FIG. 4 or 9. In the depicted configuration, the machine-learned module 422-1 implements the angle-estimation module 504. The radar system 102 also includes the digital beamformer 502, which can be implemented using signal-processing algorithms.

The machine-learned module 422-1 includes a sequence of convolutional layers 1002-1, 1002-2 . . . 1002-T and pooling layers 1004-1, 1004-2 . . . 1004-T, where T is a positive integer. As an example, the machine-learned module 422-1 includes three pairs of convolution layers 1002 and pooling layers 1004 (e.g., T equals three). The convolutional layers 1002 can perform multi-dimensional convolution operations on the beamforming data 510. The pooling layers 1004 can perform a maximum operation that passes a largest output from a cluster of neurons 710 within the previous convolutional layer 1002 to a neuron of the following convolutional layer 1002. Each pair of convolutional pooling layers 1002 and pooling layers 1004 analyze the beamforming data 510 and reduce a quantity of computations for a next pair of convolutional layers 1002 and pooling layers 1004. Accordingly, the machine-learned module 422-1 can generate the angular probability data 512 with fewer computations. A softmax function 1006 can generate the angular probability data 512 for a few angular bins 712. The angular bins 712, for instance, can include two angular bins 712-1 and 712-2 that respectively indicate if the object 202 is to the right or to the left of the smart device 104.

Figure 11:
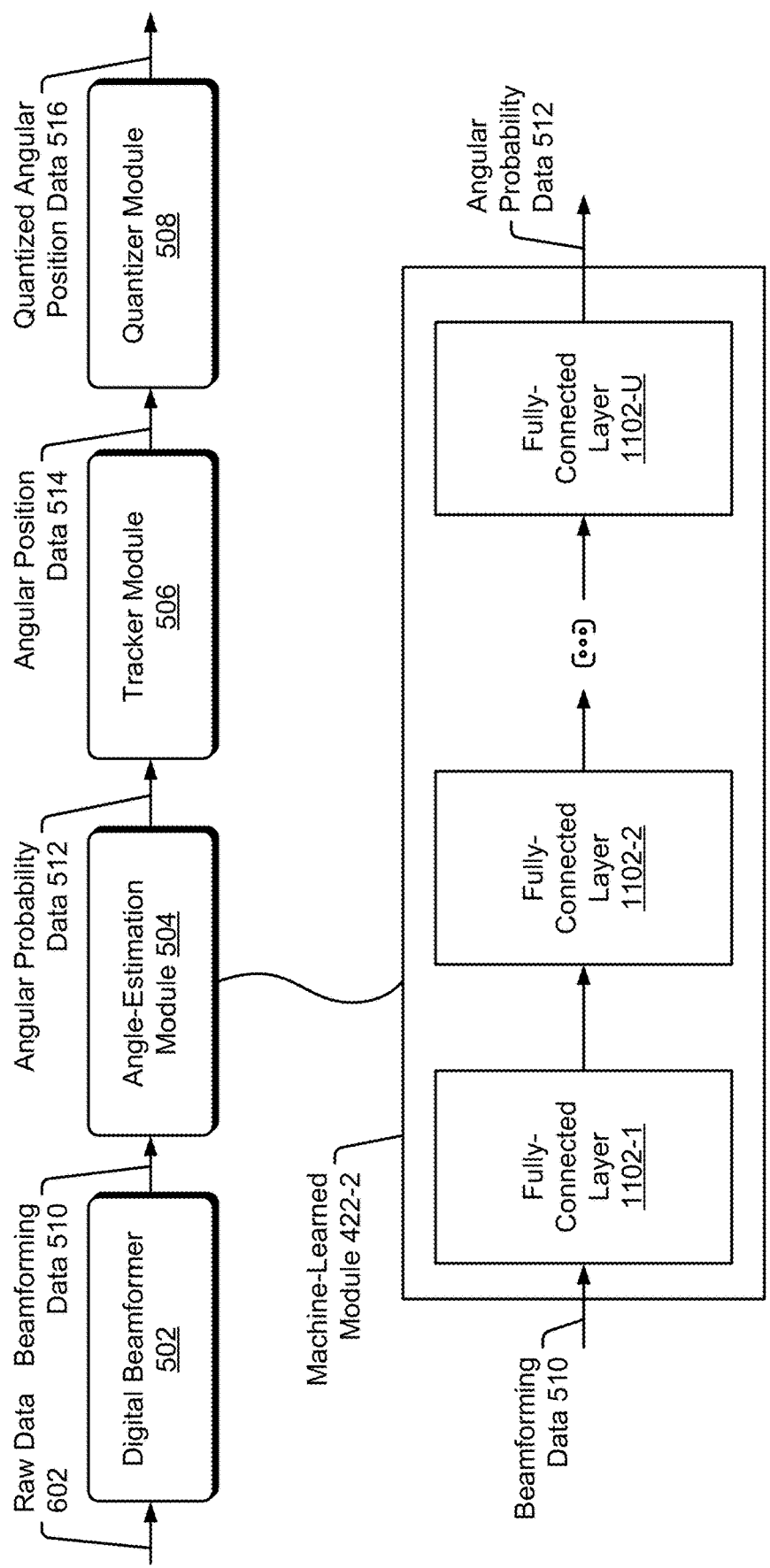
FIG. 11 illustrates an example power-conservative machine-learned module.

FIG. 11 illustrates an example power-conserving machine-learned module 422-2, which can be implemented within computationally-capable and power-constrained smart devices 104, such as the smart phone of FIG. 1 or 9. In the depicted configuration, the machine-learned module 422-2 implements the angle-estimation module 504. The radar system 102 also includes the digital beamformer 502, the tracker module 506, and the quantizer module 508, which can be implemented using signal-processing algorithms. Generally, the power-conserving machine-learned module 422-2 enables increased angular resolution and accuracy performance to be achieved within available power constraints. For example, a quantity of computations can be larger with respect to the machine-learned module 422-1 of FIG. 10 and enable the smart device 104 to operate for a target time period using battery power.

In FIG. 11, the machine-learned module 422-2 includes multiple fully-connected layers 1102-1, 1102-2 . . . 1102-U, where U represents a positive integer. A quantity of fully-connected layers, for instance, can be five (e.g., U equals five). The fully-connected layers 1102 enable the angle-estimation module 504 to provide angular probability data 512 for several angular bins 712 (e.g., four angular bins 712). The angular bins 712, for instance, can include four angular bins 712-1 to 712-4 that respectively indicate if the object 202 is in front, to the left, behind, or to the right of the smart device 104.

Figure 12:
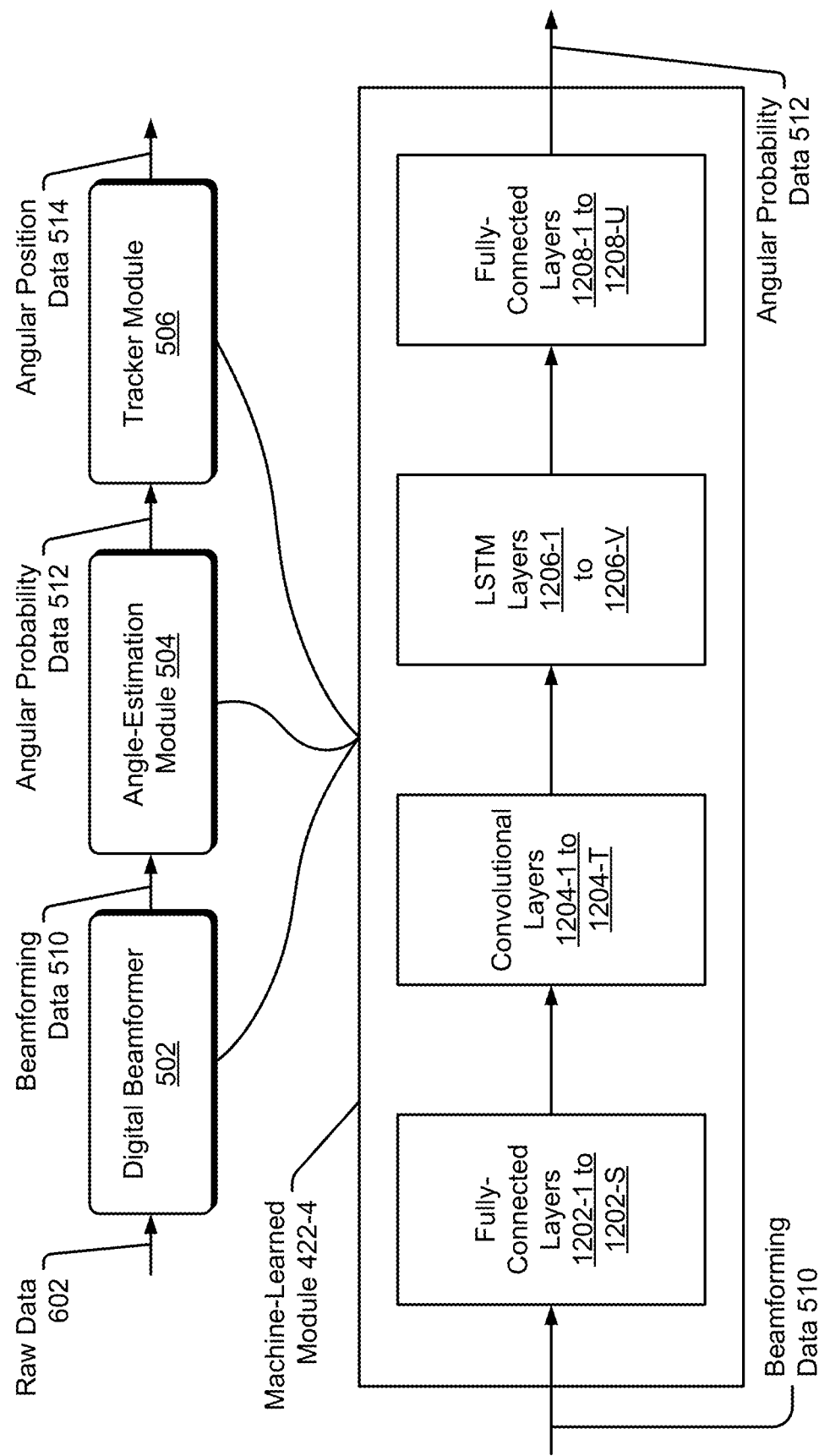
FIG. 12 illustrates an example computationally-intensive and power-intensive machine-learned module.

FIG. 12 illustrates an example computationally-intensive and power-intensive machine-learned module 422-4, which can be implemented within computationally-capable and minimally power-constrained smart devices 104, such as the gaming system 104-7 of FIG. 4 or 9. In the depicted configuration, the machine-learned module 422-4 implements the digital beamformer 502, the angle-estimation module 504, and the tracker module 506. Generally, the machine-learned module 422-4 provides increased angular resolution and consumes more power compared to the machine-learned modules 422-1 of FIG. 10 and 422-2 of FIG. 11.

The machine-learned module 422-4 includes fully-connected layers 1202-1 to 1202-S, which implement the digital beamformer 502. The variable S represents a positive integer, which can be equal to two in an example implementation. The machine-learned module 422-4 also includes convolutional layers 1204-1 to 1204-T, long short-term memory layers 1206-1 to 1206-V, and fully-connected layers 1208-1 to 1208-U, which jointly implement the angle-estimation module 504 and the tracker module 506. The variable V represents a positive integer. As an example, the machine-learned module 422-4 can include seven convolutional layers 1204 (e.g., T equals 7), three long short-term memory layers 1206 (e.g., V equals 3), and three fully-connected layers 1208 (e.g., U equals 3). The multiple long short-term memory layers 1206-1 to 1206-V enable the machine-learned module 422-4 to track multiple objects over an extended period of time. The fully-connected layers 1208-1 to 1208-U enable the angle-estimation module 504 to provide angular probability data 512 for a continuous angular measurement across 360 degrees or for many angular bins 712 (e.g., on the order of tens, hundreds, or thousands of angular bins). As shown in FIGS. 9-12, various machine-learning techniques can be employed to customize the machine-learned module 422 for a variety of different smart devices 104 and radar-based applications 406.

Example Method

Figure 13:
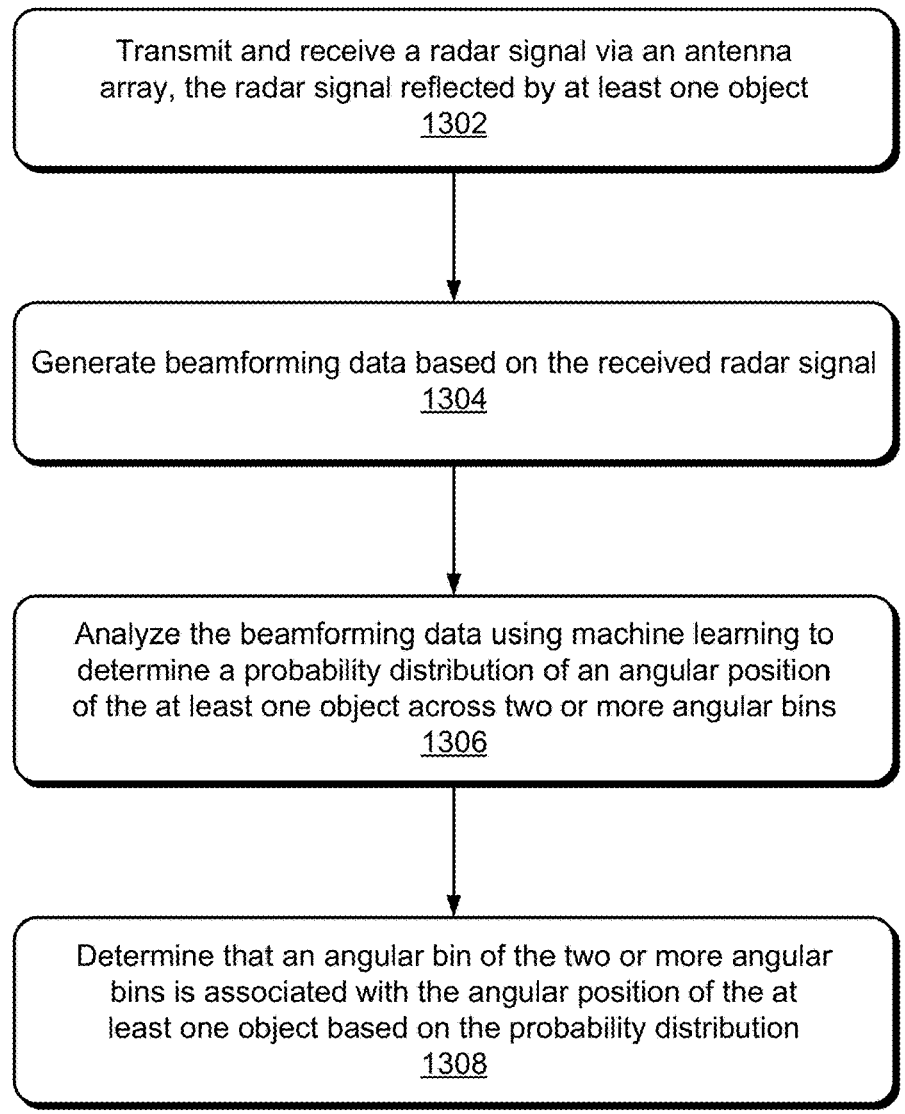
FIG. 13 illustrates an example method for performing operations of a smart-device-based radar system capable of performing angular estimation using machine learning.

FIG. 13 depicts an example method 1300 for performing operations of a smart-device-based radar system capable of performing angular estimation using machine learning. Method 1300 is shown as sets of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to the environment 100-1 to 100-6 of FIG. 1, and entities detailed in FIG. 4 or 5, reference to which is made for example only. The techniques are not limited to performance by one entity or multiple entities operating on one device.

At 1302, a radar signal is transmitted and received via an antenna array. The radar signal is reflected by at least one object. For example, the radar system 102 transmits and receives the radar signal 208 via the antenna array 412. The radar signal 208 is reflected by at least one object 202, as shown in FIG. 2. The object 202 can include a user, a portion of the user (e.g., a torso, a head, or an appendage), or multiple users, such as the multiple users in the environments of 100-3 and 100-5 of FIG. 1. The object 202 can also include an inanimate object, such as a stylus or a vehicle.

At 1304, beamforming data is generated based on the received radar signal. For example, the digital beamformer 502 (of FIG. 5) generates the beamforming data 510 based on the received radar signal 208. The digital beamformer 502 can be implemented using signal-processing techniques or machine-learning techniques. The beamforming data 510 can include spatial responses 210, as shown in FIG. 6-1, or phase coherence maps 608, as shown in FIG. 6-2.

At 1306, the beamforming data is analyzed using machine learning to determine a probability distribution of an angular position of an object across two or more angular bins. For example, the angle-estimation module 504 analyzes the beamforming data 510 using machine learning to determine a probability distribution of an angular position of the at least one object 202 across two or more angular bins 712. The angle-estimation module 504 generates angular probability data 512, which includes the probability distribution. Using machine learning, the angle-estimation module 504 can resolve angular ambiguities and identify angles associated with multiple objects 202. As shown in FIG. 5, the machine-learned module 422 of the radar system 102 implements the angular estimation module 504. In some cases, the machine-learned module 422 also implements the digital beamformer 502, the tracker module 506, the quantization module 508, or a combination thereof.

At 1308, an angular bin of the two or more angular bins is determined to be associated with the angular position of the at least one object based on the probability distribution. For example, the tracker module 506 determines that an angular bin 712 of the two or more angular bins 712-1 to 712-R is associated with the at least one object 202 based on the probability distribution within the angular probability data 512. The tracker module 506 can make this determination based on a probability of the angular bin 712. In some implementations, the tracker module 506 can also make this determination based on a previously-determined angular bin of the at least one object 202 or based on a predicted angular bin of the at least one object 202.

Example Computing System

Figure 14:
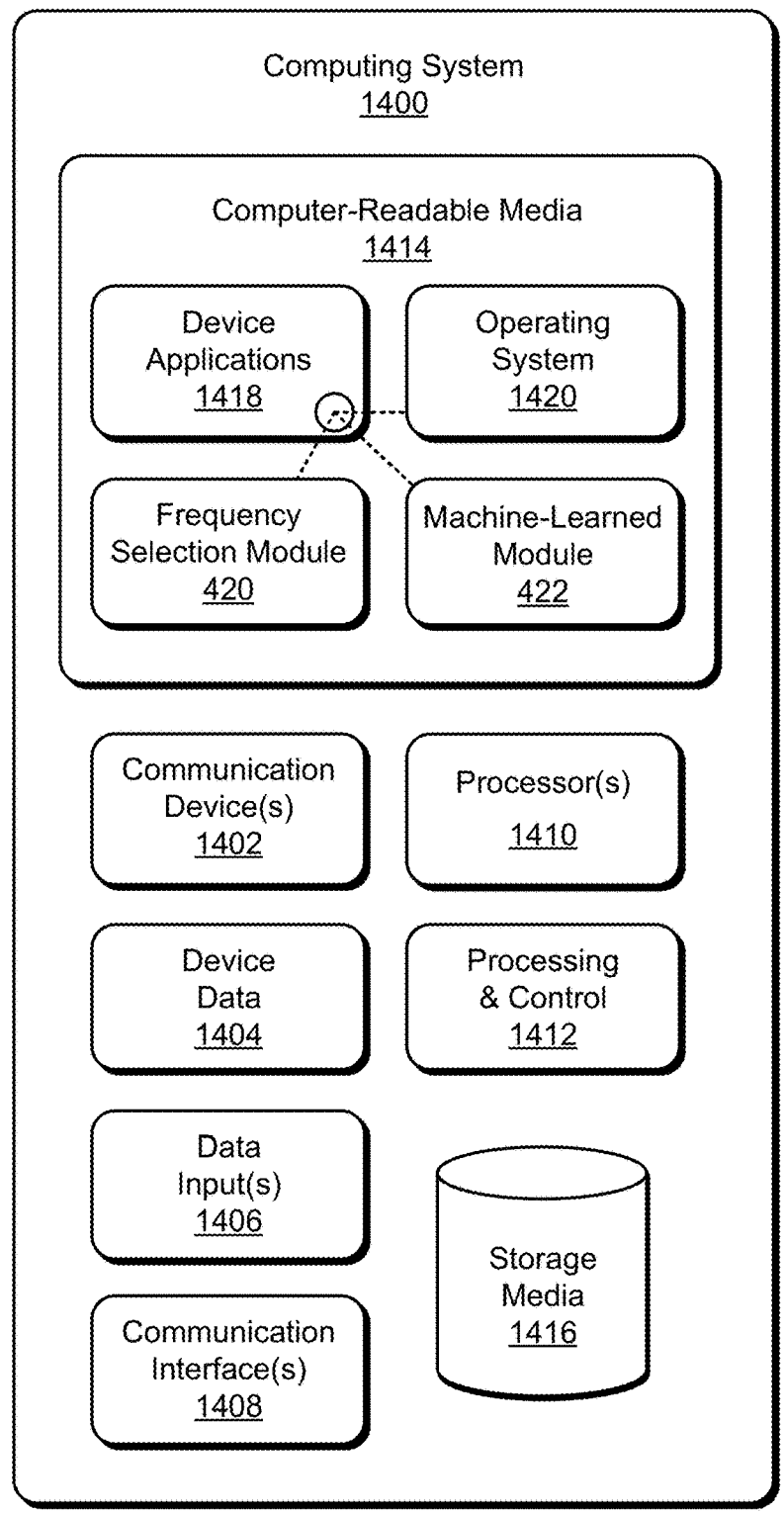
FIG. 14 illustrates an example computing system embodying, or in which techniques may be implemented that enable use of, a radar system capable of performing angular estimation using machine learning.

FIG. 14 illustrates various components of an example computing system 1400 that can be implemented as any type of client, server, and/or computing device as described with reference to the previous FIG. 2 to implement angular estimation using machine learning.

The computing system 1400 includes communication devices 1402 that enable wired and/or wireless communication of device data 1404 (e.g., received data, data that is being received, data scheduled for broadcast, or data packets of the data). The device data 1404 or other device content can include configuration settings of the device, media content stored on the device, and/or information associated with a user of the device. Media content stored on the computing system 1400 can include any type of audio, video, and/or image data. The computing system 1400 includes one or more data inputs 1406 via which any type of data, media content, and/or inputs can be received, such as human utterances, the radar-based application 406, user-selectable inputs (explicit or implicit), messages, music, television media content, recorded video content, and any other type of audio, video, and/or image data received from any content and/or data source.

The computing system 1400 also includes communication interfaces 1408, which can be implemented as any one or more of a serial and/or parallel interface, a wireless interface, any type of network interface, a modem, and as any other type of communication interface. The communication interfaces 1408 provide a connection and/or communication links between the computing system 1400 and a communication network by which other electronic, computing, and communication devices communicate data with the computing system 1400.

The computing system 1400 includes one or more processors 1410 (e.g., any of microprocessors, controllers, and the like), which process various computer-executable instructions to control the operation of the computing system 1400 and to enable techniques for, or in which can be embodied, gesture recognition in the presence of saturation. Alternatively or in addition, the computing system 1400 can be implemented with any one or combination of hardware, firmware, or fixed logic circuitry that is implemented in connection with processing and control circuits which are generally identified at 1412. Although not shown, the computing system 1400 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 1400 also includes a computer-readable media 1414, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. The disk storage device may be implemented as any type of magnetic or optical storage device, such as a hard disk drive, a recordable and/or rewriteable compact disc (CD), any type of a digital versatile disc (DVD), and the like. The computing system 1400 can also include a mass storage media device (storage media) 1416.

The computer-readable media 1414 provides data storage mechanisms to store the device data 1404, as well as various device applications 1418 and any other types of information and/or data related to operational aspects of the computing system 1400. For example, an operating system 1420 can be maintained as a computer application with the computer-readable media 1414 and executed on the processors 1410. The device applications 1418 may include a device manager, such as any form of a control application, software application, signal-processing and control module, code that is native to a particular device, a hardware abstraction layer for a particular device, and so on.

The device applications 1418 also include any system components, engines, or managers to implement angular estimation using machine learning. In this example, the device applications 1418 includes the machine-learned module 422 and the frequency selection module 420.

CONCLUSION

Although techniques using, and apparatuses including, a smart-device-based radar system performing angular estimation using machine learning have been described in language specific to features and/or methods, it is to be understood that the subject of the appended claims is not necessarily limited to the specific features or methods described. Rather, the specific features and methods are disclosed as example implementations of a smart-device-based radar system performing angular estimation using machine learning.

In the following some examples are described.

Example 1

A smart device comprising:
a radar system, the radar system including:
an antenna array;
a transceiver coupled to the antenna array and configured to transmit and receive a radar signal via the antenna array, the radar signal reflected by at least one object;
a digital beamformer coupled to the transceiver and configured to generate beamforming data based on the received radar signal; and
an angle-estimation module coupled to the digital beamformer and configured to generate, using machine learning, angular probability data based on the beamforming data, the angular probability data comprising a probability distribution of an angular position of the at least one object.

Example 2

The smart device of example 1, wherein:
the beamforming data includes at least two amplitude peaks that are representative of the angular position of the at least one object and an angular ambiguity of the at least one object; and
the angle-estimation module is configured to generate the angular probability data such that a first probability associated with the angular position of the at least one object is greater than a second probability associated with the angular ambiguity of the at least one object.

Example 3

The smart device of example 1 or 2, wherein:
the at least one object comprises a first object and a second object;
the beamforming data includes at least three amplitude peaks that are representative of a first angular position of the first object, a second angular position of the second object, and an angular ambiguity of the first object; and
the angle-estimation module is configured to generate the angular probability data such that both a first probability associated with the first angular position of the first object and a second probability associated with the second angular position of the second object are greater than a third probability associated with the angular ambiguity of the first object.

Example 4

The smart device of at least one of the preceding examples, wherein the angle-estimation module is configured to:
accept, from one or more sensors, angular measurement data associated with different angles between the smart device and a user during a given time period, the angular measurement data representing truth data;
accept other beamforming data associated with at least one other radar signal that is received during the given time period, the other beamforming data representing training data;
execute a training procedure to determine machine-learning parameters based on the training data and the truth data; and generate the angular probability data using the machine-learning parameters.

Example 5

The smart device of at least one of the preceding examples, wherein the one or more sensors include at least one of the following:
an external motion-capture system;
a camera of the smart device; or
an infra-red sensor of the smart device.

Example 6

The smart device of at least one of the preceding examples, wherein the radar system includes a tracker module coupled to the angle-estimation module and configured to determine the angular position of the at least one object based on the angular probability data.

Example 7

The smart device of example 6, wherein the tracker module is configured to:
track the at least one object based on a previously-measured angular position; and
determine the angular position of the at least one object based on the previously-measured angular position.

Example 8

The smart device of example 6 or 7, further comprising:
a radar-based application coupled to the tracker module and configured to control an operation of the smart device based on the angular position of the at least one object.

Example 9

The smart device of at least one of example 6 to 8, wherein:
the radar system includes a machine-learned module comprising the angle-estimation module, the digital beamformer, and the tracker module;
the digital beamformer is configured to:
dynamically adjust beamforming weights using the machine learning; and
generate the beamforming data using the adjusted beamforming weights; and
the tracker module is configured to determine the angular position of the at least one object using the machine learning.

Example 10

The smart device of at least one of the preceding examples, wherein the machine-learned module includes at least one of the following:
a partially-connected layer;
a fully-connected layer;
a convolutional layer;
a long short-term memory layer; or
a pooling layer.

Example 11

The smart device of at least one of the preceding examples, further comprising:
a frequency selection module coupled to the transceiver and configured to:
select a frequency sub-spectrum; and
cause the transceiver to transmit the radar signal using the frequency sub-spectrum,
wherein the angle-estimation module is configured to resolve angular ambiguities in the beamforming data based on the frequency sub-spectrum to generate the angular probability data.

Example 12

The smart device of example 11, wherein:
the frequency selection module is further configured to:
select a single frequency sub-spectrum; or
select at least two frequency sub-spectrums; and
the digital beamformer is configured to:
generate a spatial response based on the single frequency sub-spectrum; or
generate a phase coherence map based on the at least two frequency sub-spectrums.

Example 13

System with a smart device according to at least one of the preceding examples 1 to 12 and with at least one object reflective to the radar signal.

Example 14

A method comprising:
transmitting and receiving a radar signal via an antenna array, the radar signal reflected by at least one object;
generating beamforming data based on the received radar signal;
analyzing the beamforming data using the machine learning to determine a probability distribution of an angular position of the at least one object across two or more angular bins; and
determining, based on the probability distribution, that an angular bin of the two or more angular bins is associated with the angular position of the at least one object.

Example 15

The method of example 14, wherein:
the two or more angular bins include a first angular bin and a second angular bin;
the beamforming data includes at least two amplitude peaks that are representative of the angular position of the at least one object and an angular ambiguity of the at least one object; and
the analyzing of the beamforming data comprises generating the probability distribution such that the first angular bin associated with the angular position of the at least one object has a higher probability than the second angular bin associated with the angular ambiguity of the at least one object.

Example 16

The method of example 14 or 15, wherein:
the at least one object comprises a first object and a second object;
the two or more angular bins include a first angular bin, a second angular bin, and a third angular bin;

the beamforming data includes at least three amplitude peaks that are representative of a first angular position of the first object, a second angular position of the second object, and an angular ambiguity associated with the first object;

the analyzing of the beamforming data comprises generating the probability distribution such that both a first angular bin associated with the first angular position of the first object and a second angular bin associated with the second angular position of the second object have higher probabilities than a third angular bin associated with the angular ambiguity of the first object; and the determining of the angular bin comprises determining that the first angular bin is associated with the first object and that the second angular bin is associated with the second object.

Example 17

The method of at least one of the examples 14 to 16, further comprising:

accepting, from one or more sensors, angular measurement data associated with different angles to a user during a given time period, the angular measurement data representing truth data;

accepting other beamforming data collected from one or more prior radar signals received during the given time period, the other beamforming data representing training data;

executing a training procedure to determine machine-learning parameters based on the training data and the truth data; and generating the probability distribution using the machine-learning parameters.

Example 18

A computer-readable storage media comprising computer-executable instructions that, responsive to execution by a processor, implement:

an angle-estimation module configured to:

accept beamforming data associated with a received radar signal that is reflected by at least one object; and generate, using machine learning, angular probability data based on the beamforming data, the angular probability data comprising a probability distribution of an angular position of the at least one object; and a tracker module configured to determine the angular position of the at least one object based on the probability distribution.

Example 19

The computer-readable storage media of example 18, wherein the computer-executable instructions, responsive to execution by the processor, implement a machine-learned module comprising the angle-estimation module and the tracker module.

Example 20

The computer-readable storage media of example 18 or 19, wherein the machine-learned module includes a digital beamformer configured to generate the beamforming data using the machine learning.

Example 21

The computer-readable storage media of at least one of the examples 18 to 20, wherein the angle-estimation module is configured to:

accept, from one or more sensors, angular measurement data associated with different angles to a user during a given time period, the angular measurement data representing truth data;

accept other beamforming data associated with at least one other radar signal that is received during the given time period, the beamforming data representing training data;

execute a training procedure to determine machine-learning parameters based on the training data and the truth data; and generate the angular probability data using the machine-learning parameters.

The invention claimed is:

1. A smart device comprising:
   a radar system, the radar system including:
      an antenna array;
      a transceiver coupled to the antenna array and configured to transmit and receive a radar signal via the antenna array, the radar signal reflected by at least one object;
      a digital beamformer coupled to the transceiver and configured to generate beamforming data based on the received radar signal; and
      an angle-estimation module coupled to the digital beamformer and configured to generate, using a regression model associated with machine learning, angular probability data based on the beamforming data, the angular probability data comprising a probability distribution of an angular position of the at least one object, the probability distribution comprising values between 0% and 100% across a set of angles.

2. The smart device of claim 1, wherein:
   the beamforming data includes at least two amplitude peaks that are representative of the angular position of the at least one object and an angular ambiguity of the at least one object; and
   the angle-estimation module is configured to generate the angular probability data such that a first probability associated with the angular position of the at least one object is greater than a second probability associated with the angular ambiguity of the at least one object.

3. The smart device of claim 1, wherein:
   the at least one object comprises a first object and a second object;
   the beamforming data includes at least three amplitude peaks that are representative of a first angular position of the first object, a second angular position of the second object, and an angular ambiguity of the first object; and
   the angle-estimation module is configured to generate the angular probability data such that both a first probability associated with the first angular position of the first object and a second probability associated with the second angular position of the second object are greater than a third probability associated with the angular ambiguity of the first object.

4. The smart device of claim 1, wherein the angle-estimation module is configured to:
   accept, from one or more sensors, angular measurement data associated with different angles between the smart device and a user during a given time period, the angular measurement data representing truth data;
   accept other beamforming data associated with at least one other radar signal that is received during the given time period, the other beamforming data representing training data;

execute a training procedure to determine machine-learning parameters based on the training data and the truth data; and
generate the angular probability data using the machine-learning parameters.

5. The smart device of claim 4, wherein the one or more sensors include at least one of the following:
an external motion-capture system;
a camera of the smart device; or
an infra-red sensor of the smart device.

6. The smart device of claim 1, wherein the radar system includes a tracker module coupled to the angle-estimation module and configured to determine the angular position of the at least one object based on the angular probability data.

7. The smart device of claim 6, further comprising:
a radar-based application coupled to the tracker module and configured to control an operation of the smart device based on the angular position of the at least one object.

8. The smart device of at least one of claim 6, wherein:
the radar system includes a machine-learned module comprising the angle-estimation module, the digital beamformer, and the tracker module;
the digital beamformer is configured to:
dynamically adjust beamforming weights using the machine learning; and
generate the beamforming data using the adjusted beamforming weights; and
the tracker module is configured to determine the angular position of the at least one object using the machine learning.

9. The smart device of claim 1, wherein the angle-estimation module includes at least one of the following:
a partially-connected layer;
a fully-connected layer;
a convolutional layer;
a long short-term memory layer; or
a pooling layer.

10. The smart device of claim 1, further comprising:
a frequency selection module coupled to the transceiver and configured to:
select a frequency sub-spectrum; and
cause the transceiver to transmit the radar signal using the frequency sub-spectrum,
wherein the angle-estimation module is configured to resolve angular ambiguities in the beamforming data based on the frequency sub-spectrum to generate the angular probability data.

11. The smart device of claim 10, wherein:
the frequency selection module is further configured to:
select a single frequency sub-spectrum; or
select at least two frequency sub-spectrums; and
the digital beamformer is configured to:
generate a spatial response based on the single frequency sub-spectrum; or
generate a phase coherence map based on the at least two frequency sub spectrums.

12. The smart device of claim 1, wherein the beamforming data comprises at least one of the following:
a spatial response comprising amplitude and phase information for a set of angles and ranges; or
a phase coherence map comprising phase information of a complex coherence between a pair of spatial responses associated with a frequency sub-spectrum.

13. A method comprising:
transmitting and receiving a radar signal via an antenna array, the radar signal reflected by at least one object;
generating beamforming data based on the received radar signal;
analyzing the beamforming data using a regression model associated with machine learning to determine a probability distribution of an angular position of the at least one object across two or more angular bins, the probability distribution comprising values between 0% and 100% across the two or more angular bins; and
determining, based on the probability distribution, that an angular bin of the two or more angular bins is associated with the angular position of the at least one object.

14. The method of claim 13, wherein:
the two or more angular bins include a first angular bin and a second angular bin;
the beamforming data includes at least two amplitude peaks that are representative of the angular position of the at least one object and an angular ambiguity of the at least one object; and
the analyzing of the beamforming data comprises generating the probability distribution such that the first angular bin associated with the angular position of the at least one object has a higher probability than the second angular bin associated with the angular ambiguity of the at least one object.

15. The method of claim 13, wherein:
the at least one object comprises a first object and a second object;
the two or more angular bins include a first angular bin, a second angular bin, and a third angular bin;
the beamforming data includes at least three amplitude peaks that are representative of a first angular position of the first object, a second angular position of the second object, and an angular ambiguity associated with the first object;
the analyzing of the beamforming data comprises generating the probability distribution such that both a first angular bin associated with the first angular position of the first object and a second angular bin associated with the second angular position of the second object have higher probabilities than a third angular bin associated with the angular ambiguity of the first object; and
the determining of the angular bin comprises determining that the first angular bin is associated with the first object and that the second angular bin is associated with the second object.

16. The method of claim 13, further comprising:
accepting, from one or more sensors, angular measurement data associated with different angles to a user during a given time period, the angular measurement data representing truth data;
accepting other beamforming data collected from one or more prior radar signals received during the given time period, the other beamforming data representing training data;
executing a training procedure to determine machine-learning parameters based on the training data and the truth data; and
generating the probability distribution using the machine-learning parameters.

17. A computer-readable storage media comprising computer-executable instructions that, responsive to execution by a processor, implement:
an angle-estimation module configured to:
accept beamforming data associated with a received radar signal that is reflected by at least one object; and generate, using a regression model associated with machine learning, angular probability data based on the beamforming data, the angular probability data comprising a probability distribution of an angular position of the at least one object, the probability distribution comprising values between 0% and 100% across a set of angles; and a tracker module configured to determine the angular position of the at least one object based on the probability distribution.

18. The computer-readable storage media of claim 17, wherein the computer-executable instructions, responsive to execution by the processor, implement a machine-learned module comprising the angle-estimation module and the tracker module.

19. The computer-readable storage media of claim 18, wherein the machine learned module includes a digital beamformer configured to generate the beamforming data using the machine learning.

20. The computer-readable storage media of claim 17, wherein the angle-estimation module is configured to:

accept, from one or more sensors, angular measurement data associated with different angles to a user during a given time period, the angular measurement data representing truth data;

accept other beamforming data associated with at least one other radar signal that is received during the given time period, the beamforming data representing training data;

execute a training procedure to determine machine-learning parameters based on the training data and the truth data; and generate the angular probability data using the machine-learning parameters.

* * * * *